United States Patent
Aas et al.

(10) Patent No.: US 10,861,125 B2
(45) Date of Patent: Dec. 8, 2020

(54) PREPARING AND EXECUTING COMMAND STREAMS IN DATA PROCESSING SYSTEMS

(71) Applicant: Arm Limited, Cambridge (GB)

(72) Inventors: Arne Aas, Trondheim (NO); Sandeep Kakarlapudi, Trondheim (NO); Hakan Lars-Goran Persson, Bjarred (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/402,031

(22) Filed: May 2, 2019

(65) Prior Publication Data

US 2019/0340722 A1    Nov. 7, 2019

(30) Foreign Application Priority Data

May 2, 2018  (GB) .................................. 1807255.3

(51) Int. Cl.
*G06T 1/20*  (2006.01)
*G06F 9/52*  (2006.01)
*G06F 9/48*  (2006.01)

(52) U.S. Cl.
CPC .............. *G06T 1/20* (2013.01); *G06F 9/4881* (2013.01); *G06F 9/52* (2013.01)

(58) Field of Classification Search
None
See application file for complete search history.

(56) References Cited

U.S. PATENT DOCUMENTS

| 10,559,123 B2* | 2/2020 | Goel ..................... G06T 15/005 |
| 2008/0198166 A1 | 8/2008 | Chung |
| 2010/0011195 A1 | 1/2010 | Ishii |
| 2010/0110089 A1 | 5/2010 | Paltashev |

FOREIGN PATENT DOCUMENTS

| GB | 2486485 | 6/2012 |
| GB | 2544994 | 6/2017 |
| WO | WO 2006/083542 | 8/2006 |

OTHER PUBLICATIONS

GB Combined Search and Examination report dated Nov. 14, 2018, GB Patent Application No. GB1807255.3.

* cited by examiner

*Primary Examiner* — Edward Martello
(74) *Attorney, Agent, or Firm* — Vierra Magen Marcus LLP

(57) ABSTRACT

When a processing resource of a data processing system is to perform processing tasks for applications executing on a host processor, the host processor prepares a plurality of command streams to cause the processing resource to perform the processing tasks. When a processing task to be added to a command stream has a dependency on a processing task or tasks that will be included in another command stream, a wait command is added to the command stream that is to include the processing task that has a dependency on a processing task or tasks that will be included in the another command stream, to cause the processing resource to delay executing subsequent commands in the command stream after the wait command, until the processing resource has reached a particular position in the another command stream.

23 Claims, 10 Drawing Sheets

PREPARING AND EXECUTING COMMAND STREAMS IN DATA PROCESSING SYSTEMS

BACKGROUND

The technology described herein relates to data processing systems and in particular to the submission of processing tasks to a processing resource, such as a graphics processor, of a data processing system.

Many data processing systems include processing resources, such as a graphics processor (graphics processing unit (GPU)) that may perform processing tasks for, e.g., applications that are executing on a main (e.g. host) processor (CPU) of the data processing system.

The processing resource, e.g. graphics processor, may be caused to perform processing tasks for applications by providing to the processing resource a stream of commands (instructions) to be executed by the processing resource. For example, a driver for the processing resource may prepare a command stream containing commands (instructions) to be performed by the processing resource, and provide the command stream to the processing resource (e.g. graphics processor), with the processing resource then performing the commands (the operations indicated by the commands) in the command stream. The command stream may, for example, contain commands (instructions) to set parameters for processing tasks, as well as commands (instructions) to execute the processing tasks. The processing resource will then work its way through the command stream, executing the commands (instructions) in the command stream, in turn.

The Applicants have recognised that in some circumstances, the tasks to be performed by a processing resource may have dependencies between them, such that, for example, they need to be executed in a particular order. An example of this is geometry tasks for a graphics processor, in which there may typically be a serial dependency between the geometry tasks, as they have to be executed in the same order as the API (Application Program Interface) draw calls. This can straightforwardly be achieved by ordering the geometry tasks appropriately in the command stream that is provided to the graphics processor.

The Applicants have further recognised that it can be the case that a given processing task to be performed by a processing resource may not in itself fully utilise all the available resources of the processing resource. An example of this in a graphics processor could be where tessellation is required, as such tessellation may require a number of serially dependent tessellation tasks (followed by a single geometry task), but which tessellation tasks typically will not individually require all the processing resources of the graphics processor to complete (e.g. because they will not contain enough work items to be processed to fully utilise the graphics processor's processing resources). Moreover, such tessellation tasks can run for a relatively long time.

It would be possible in this regard simply to include such smaller, e.g. tessellation, tasks in order in the command stream. In this case, such "reduced" processing tasks, e.g. tessellation tasks, would simply be added to the end of the existing command stream that is being prepared. However, this may then not utilise the resources of the processing resource (e.g. graphics processor) in the most efficient manner.

It may alternatively be possible to achieve greater utilisation (and thus efficiency) of the processing resource in such situations by, e.g., modifying the existing command stream to insert the smaller (e.g. tessellation) tasks at an earlier point in the command stream such that those tasks could then, e.g., be executed in parallel on the processing resource (e.g. graphics processor) with other processing tasks before their results are required.

However, such operation would require more sophisticated driver operation and may accordingly cause significant host processor loading and overhead for the driver operation, e.g., both because the previously prepared command stream would need to be modified, but also because appropriate "modification" (e.g. task "insertion") points in the existing command stream would need to be tracked. Furthermore, such "tracking" may be required to be done at all times, as it may not be possible to predict in advance when a modification of the existing command stream could be required.

The Applicants accordingly believe that there remains scope for improvements to the submission of processing tasks for execution to a processing resource, such as a graphics processor, of a data processing system.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
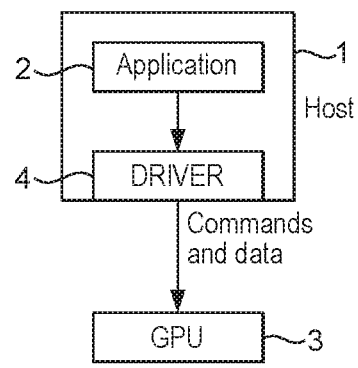
FIG. 1 shows an exemplary graphics processing system.

A first embodiment of the technology described herein comprises a method of operating a data processing system that comprises:

a host processor configured to execute applications of the data processing system; and a processing resource configured to perform processing tasks for applications executing on the host processor;

the method comprising:

preparing on the host processor, in response to a request for processing to be performed by the processing resource from an application, a plurality of command streams to cause the processing resource to perform processing tasks for the application, each command stream including a sequence of commands to cause the processing resource to perform processing tasks;

wherein preparing the command streams comprises:

when a processing task to be added to a command stream of the plurality of command streams has a dependency on a processing task or tasks that will be included in another command stream of the plurality of command streams:

including in the command stream that is to include the
processing task that has a dependency on a processing
task or tasks that will be included in another command
stream, a wait command that will cause the processing
resource to delay executing subsequent commands in
the command stream that includes the wait command,
until the processing resource has reached a particular
position in the another command stream; the method
further comprising:
the host processor providing the plurality of command
streams to the processing resource; and
the processing resource executing the commands in the
plurality of command streams so as to perform processing
tasks for the application;
the executing the commands in the command streams by
the processing resource comprising:
when a command stream includes a wait command, the
processing resource not executing subsequent commands in
the command stream that included the wait command until
the processing resource has reached the particular position in
the another command stream for the wait command; and
when the processing resource has reached the particular
position in the another command stream for the wait command, the processing resource executing subsequent commands after the wait command in the command stream that
included the wait command.

A second embodiment of the technology described herein
comprises a data processing system comprising:
a host processor configured to execute applications of the
data processing system; and
a processing resource configured to perform processing
tasks for applications executing on the host processor;
wherein the host processor comprises:
a command stream generating circuit configured to prepare, in response to a request for processing to be performed
by the processing resource from an application, a plurality of
command streams to cause the processing resource to perform processing tasks for the application, each command
stream including a sequence of commands to cause the
processing resource to perform processing tasks;
wherein the command stream generating circuit is further
configured to:
when a processing task to be added to a command stream
of the plurality of command streams has a dependency
on a processing task or tasks that will be included in
another command stream of the plurality of command
streams:
include in the command stream that is to include the
processing task that has a dependency on a processing
task or tasks that will be included in another command
stream, a wait command that will cause the processing
resource to delay executing subsequent commands in
the command stream that includes the wait command,
until the processing resource has reached a particular
position in the another command stream; the host
processor further comprising:
a processing circuit configured to provide the plurality of
command streams to the processing resource; and
the processing resource comprising:
an execution circuit configured to execute the commands
in the plurality of command streams so as to perform
processing tasks for an application;
wherein the execution circuit is configured to:
in response to a command stream including a wait command, not execute subsequent commands in the command
stream that included the wait command until the processing resource has reached a particular position in another command stream indicated for the wait command; and to:
when the processing resource has reached the particular
position in the another command stream for the wait command, execute subsequent commands after the wait command in the command stream that included the wait command.

The technology described herein relates to arrangements
in which a processing resource, such as a graphics processor,
is configured to execute commands (instructions) in a command stream to perform processing tasks for applications
executing on a host processor.

However, in the technology described herein, rather than
simply providing a single command stream for execution to
the processing resource, a plurality of command streams are
prepared and provided to the processing resource for execution. Furthermore, a command stream can include a "wait"
command that causes the processing resource to delay
executing subsequent commands in the command stream
until the processing resource has reached a particular position in another (different) command stream. In other words,
a command stream can include a "progress wait" command
that causes the processing resource to delay executing
subsequent commands in the command stream until the
processing resource has reached a particular position in
another (different) command stream (has made an indicated
amount of progress in another (different) command stream).

As will be discussed further below, this arrangement then
facilitates more straightforward synchronisation of the
execution of processing tasks that have dependencies on
each other, and in a way that can more fully and more
efficiently use the resources of the processing resource, as
compared, for example, to arrangements which use only a
single command stream.

Furthermore, the operation and command stream preparation and processing task execution in the manner of the
technology described herein can be achieved without the
need for significant main (host) processor (CPU) overhead,
and without, for example, requiring significantly more
sophisticated driver operation for the processing resource.

The technology described herein also extends to the
operation of preparing the command streams per se, and,
correspondingly, to the processing resource executing the
command streams per se.

Thus, a further embodiment of the technology described
herein comprises a method of operating a host processor of
a data processing system that comprises a host processor
configured to execute applications of the data processing
system, and a processing resource configured to perform
processing tasks for applications executing on the host
processor;
the method comprising:
preparing on the host processor, in response to a request
for processing to be performed by the processing resource
from an application, a plurality of command streams to
cause the processing resource to perform processing tasks
for the application, each command stream including a
sequence of commands to cause the processing resource to
perform processing tasks;
wherein preparing the command streams comprises:
when a processing task to be added to a command stream
of the plurality of command streams has a dependency
on a processing task or tasks that will be included in
another command stream of the plurality of command
streams:
including in the command stream that is to include the
processing task that has a dependency on a processing task or tasks that will be included in another command stream, a wait command that will cause the processing resource to delay executing subsequent commands in the command stream that includes the wait command, until the processing resource has reached a particular position in the another command stream; the method further comprising:

the host processor providing the plurality of command streams to a processing resource for execution.

A further embodiment of the technology described herein comprises a host processor for a data processing system, the host processor configured to execute applications of the data processing system, and comprising:

a command stream generating circuit configured to prepare, in response to a request from an application for processing to be performed by a processing resource of the data processing system, a plurality of command streams to cause the processing resource to perform processing tasks for the application, each command stream including a sequence of commands to cause the processing resource to perform processing tasks;

wherein the command stream generating circuit is further configured to:

when a processing task to be added to a command stream of the plurality of command streams has a dependency on a processing task or tasks that will be included in another command stream of the plurality of command streams:

include in the command stream that is to include the processing task that has a dependency on a processing task or tasks that will be included in another command stream, a wait command that will cause the processing resource to delay executing subsequent commands in the command stream that includes the wait command, until the processing resource has reached a particular position in the another command stream; the host processor further comprising:

a processing circuit configured to provide the plurality of command streams to the processing resource.

A further embodiment of the technology described herein comprises a method of operating a processing resource of a data processing system, the processing resource being configured to perform processing tasks for applications executing on a host processor of the data processing system;

the method comprising:

the processing resource receiving from a host processor of the data processing system, a plurality of command streams to cause the processing resource to perform processing tasks for an application executing on the host processor, each command stream including a sequence of commands to cause the processing resource to perform processing tasks, and at least one of the command streams including a wait command that will cause the processing resource to delay executing subsequent commands in the command stream that includes the wait command, until the processing resource has reached a particular position in another command stream;

and the processing resource executing the commands in the plurality of command streams so as to perform processing tasks for the application;

the executing the commands in the command streams by the processing resource comprising:

when a command stream includes a wait command, the processing resource not executing subsequent commands in the command stream that included the wait command until the processing resource has reached the particular position in the another command stream for the wait command; and when the processing resource has reached the particular position in the another command stream for the wait command, the processing resource executing subsequent commands after the wait command in the command stream that included the wait command.

A further embodiment of the technology described herein comprises a processing resource for a data processing system, the processing resource configured to perform processing tasks for applications executing on a host processor of the data processing system, and comprising:

an execution circuit configured to execute commands in a plurality of command streams received from a host processor so as to perform processing tasks for an application executing on the host processor, each command stream including a sequence of commands to cause the processing resource to perform processing tasks;

wherein the execution circuit is configured to:

in response to a command stream including a wait command that will cause the processing resource to delay executing subsequent commands in the command stream that includes the wait command until the processing resource has reached a particular position in another command stream, not execute subsequent commands in the command stream that included the wait command until the processing resource has reached a particular position in another command stream indicated for the wait command; and to:

when the processing resource has reached the particular position in the another command stream for the wait command, execute subsequent commands after the wait command in the command stream that included the wait command.

The processing resource can be any suitable processing resource that is configured to perform processing tasks for applications. In an embodiment, the processing resource is a graphics processor (a graphics processing unit (GPU)). In another embodiment, the processing resource is a video processor and/or an image processor.

The processing that is to be performed by the processing resource can be any suitable and desired processing that the processing resource in question can perform. This may, and in an embodiment does, accordingly depend upon the nature of the processing resource.

In the case of a graphics processor, in an embodiment the processing to be performed comprises appropriate graphics processing, such as generating graphics processing outputs, such as rendering frame (images) for display and/or for other purposes (e.g. render to texture operations).

In one embodiment, in the case of a graphics processor, the processing to be performed comprises geometry processing, and in particular geometry processing where tessellation may be required (where there may or will be a need to produce and process some tessellated geometry (the geometry processing will include a tessellation step/stage)).

In another embodiment, in the case of a graphics processor, the processing to be performed is an interleaved rendering operation, i.e. in which plural rendering passes are each divided into many tasks, with the tasks then being interleaved across the (plural) rendering passes (e.g. to reduce the amount of cache that is needed to hold intermediate results).

In another embodiment, in the case of a graphics processor, the processing to be performed relates to graphics shader processing and operations, and in particular to arrangements in which one or more "pilot" shaders (as described in the Applicant's earlier U.S. Pat. No. 9,189,881, for example) are to be executed, followed by executing non-pilot shader program(s).

The processing tasks that are to be performed by the processing resource can be any suitable and desired processing tasks that the processing resource in question can perform. They may, and in an embodiment do, accordingly depend upon the nature of the processing resource, and on the particular processing that is to be performed by the processing resource.

It is envisaged that the technology described herein may be particularly useful where there may be different types of processing tasks to be performed by the processing resource, particularly in the case where the processing tasks have different levels of utilisation of the processing resource and are interdependent on each other. Thus in one embodiment, the processing tasks to be performed by the processing resource comprise: processing tasks that will more fully (e.g. fully) utilise the processing resource when they are being performed; and processing tasks that will less fully (and not fully) utilise the resources of the processing resource when they are being performed (and that, e.g., and in an embodiment, can accordingly be performed in parallel with other processing tasks on the processing resource). In an embodiment, one or more of the processing tasks that more fully utilise the processing resource are dependent on (e.g. require the results from) one or more of the processing tasks that will less fully utilise the processing resource.

An example of this would be graphics geometry processing that includes a tessellation operation, in which case the "normal" graphics geometry processing tasks may, and typically will, more fully utilise processing the graphics processor, but be dependent upon tessellation processing tasks (e.g. compute jobs) that in themselves will not utilise the graphics processor so fully.

However, it would also be possible for the technology described herein to be used in situations where the processing tasks utilise the processing resource substantially equally (but again have an interdependency on each other). An example of this would be interleaved rendering, where different rendering passes will in effect use the same processing tasks (and so have similar utilisation of the graphics processor), but will be interdependent.

In the case of a graphics processor, in an embodiment the processing tasks comprise appropriate graphics processing operations, such as for generating graphics processing outputs, such as rendering frames (images) for display and/or for other purposes (e.g. render to texture operations).

In one embodiment, the processing tasks to be performed in the case of a graphics processor comprise one or more of: graphics processing tasks that are other than (that are not) graphics compute tasks; and graphics compute tasks (where the graphics processor is acting as an general purpose graphics processor (GPGPU) to perform compute processing (compute jobs)).

In one such embodiment, the graphics compute tasks comprise compute tasks that are to perform tessellation, and/or the non-compute tasks comprise graphics geometry processing tasks (geometry jobs). In an embodiment, the processing tasks comprise geometry processing tasks and tessellation compute tasks. In this case therefore, the processing tasks will relate to the production and processing of tessellated geometry.

In such arrangements, particularly in the case of tile-based graphics processing, the geometry processing task may, and in an embodiment does, comprise geometry processing that processes graphics vertices and prepares the result for a later tile-based fragment rendering task. The geometry processing may consist, for example, of computing vertex coordinates, computing attributes for each vertex, and sorting the primitives into tiles. The compute tasks may comprise, for example, general compute tasks that do not use the specific hardware required for sorting primitives into tiles or reading the primitive lists for each tile, or may, e.g., be integrated with the tile sorting (e.g. small bits of the compute tasks executed on demand from the tile sorting). There may also be fragment tasks that render the fragments for the primitives that apply to each tile.

In another embodiment, there are one or more processing tasks that relate to pilot shader processing, and one or more processing tasks that then relate to "full" (or at least the remaining after the pilot shader operations) shader operation. In this case the "full" shader operation processing tasks may be dependent upon the "pilot" shader operation and processing tasks.

Any desired number of (plural) command streams can be prepared for the processing resource. In one embodiment, only two command streams are prepared, but in other embodiments more than two command streams are prepared.

Each command stream may relate to any suitable and desired processing tasks.

In one embodiment, each command stream relates to a different type or types of processing task. For example, and in an embodiment, one (or more) command stream may relate to processing tasks that more fully (e.g. that fully) utilise the resources of the processing resource when they are being executed, with another command stream or command streams relating to processing tasks that less fully (that other than (that do not) fully) utilise the processing resources of the processing resource when being executed.

In such arrangements, in the case of a graphics processor, in one embodiment, one (or more) command stream accordingly relates to compute tasks for the graphics processor, with the other (or another) command stream (or streams) relating to non-compute tasks (tasks that are other than compute tasks). In one such arrangement, one (or more) command stream relates to geometry tasks (geometry jobs) for the graphics processor, and another command stream (or streams) relates to compute tasks (compute jobs), and in an embodiment tessellation compute tasks, for the graphics processor.

In another embodiment in the case of a graphics processor, one (or more) command stream relates to pilot shader tasks for the graphics processor, with the other (or another) command stream (or streams) relating to other, non-pilot, shader tasks for the graphics processor.

In other embodiments, each or at least plural of the command streams relate to tasks of the same type. In the case of a graphics processor, this may particularly be the case, for example, when performing interleaved rendering, in which case there may be plural command streams each including respective rendering tasks, but relating to, e.g., different rendering passes of the sequence of rendering passes to be performed for the interleaved rendering operation.

Each command stream should, and in an embodiment does, include one or more, and in an embodiment plural, commands (instructions). As well as (where appropriate and desired) including a (progress) wait command (instruction) in the manner of the technology described herein, the command streams can otherwise include any suitable and desired commands (instructions) to cause the processing resource to perform the desired processing tasks, e.g., and in an embodiment, in accordance with the command stream operation of the data processing system and processing resource in question. Thus, in an embodiment, the command streams can, and in an embodiment do, include one or more or all of: commands (instructions) to set parameters for processing tasks, commands (instructions) to execute the processing tasks, commands (instructions) to wait for the completion of a processing task, etc.

In an embodiment, the command streams can, and in an embodiment do, include (at least) commands (instructions) that cause subsequent execution of the command stream in question to be stopped (blocked) until an (e.g., and in an embodiment, indicated) set or subset of previously issued processing tasks for the command stream in question have been completed. Such a command will accordingly cause a subsequent execution of commands in a command stream to be delayed until previous commands (and in particular a processing task or tasks) in the command stream in question have been completed. Such a mechanism can therefore be used to ensure that the execution of commands in a command stream will wait until a particular processing task or tasks for that command stream have been completed before subsequent commands (instructions) in the command stream are executed. (This should be distinguished from the "progress wait" commands of the technology described herein that have the effect of delaying execution of commands in a command stream until a particular point has been reached in another, different command stream.)

Thus, in an embodiment, the command streams can, and in an embodiment do, include (at least) commands that indicate when processing tasks are started and finished, such as commands to trigger the execution of a processing task, and commands to determine/indicate (to wait for) the completion of a processing task.

The "another command stream" progress wait commands that can be included in a command stream in accordance with the technology described herein can take any suitable and desired form that will cause the processing resource to delay executing subsequent commands in the command stream until the processing resource has reached a particular position in another command stream (i.e. that will cause the processing resource to not execute the commands following the wait command in the command stream in question until the processing resource has reached a particular position in another command stream).

In an embodiment, the wait command indicates both the other command stream that is to be waited for (e.g., and in an embodiment, an identifier for that command stream), and the particular position in that other command stream to be waited for (i.e. that must be reached in the other command stream before the processing resource will execute the subsequent commands in the command stream that includes the wait command). In an embodiment, the wait command indicates one (and only one) other command stream that is to be waited on. (In the case where it is desired to be able to indicate plural command streams that are to be waited on, then that may be done, e.g., and in an embodiment, by including plural "progress wait" commands in a command stream, e.g. in series.)

The particular position in a command stream to wait for (and the determination of when that position has been reached in a command stream) can be indicated (and determined) in any suitable and desired manner. In an embodiment, the particular position corresponds to a particular command in the command stream in question and, in an embodiment, to the completion of a particular, in an embodiment selected, processing task of the another command stream.

The indication of the position in the command stream to wait for in an embodiment indicates the minimum position to be reached in the other command stream before continuing execution of the commands in the command stream that includes the wait command.

In an embodiment, the progress along a (and each) command stream is tracked, and the particular position to wait for is indicated in terms of the progress point that has been reached in the command stream. In an embodiment, a (and each) command stream has a progress counter that is associated with it that can be (and is) incremented as commands in the command stream in question are added/ executed, with the progress wait commands correspondingly indicating a particular progress counter value to wait for (and in an embodiment a minimum progress counter value to wait for).

The progress counter for a command stream is, in an embodiment, incremented (in an embodiment only) when a particular, in an embodiment selected, in an embodiment predefined, command or commands (e.g. a command of a set of plural particular, in an embodiment selected, in an embodiment predefined, commands) is added to/executed for a command stream. Thus, in an embodiment only some, but not all, commands that may be (and are) included in a command stream will increment the progress count for a command stream.

The particular command(s) that trigger a progress counter increment are in an embodiment commands that are more "significant", such as, and in an embodiment, commands that indicate the start or finish of processing resource work (e.g. a processing task or tasks), such as, and in an embodiment, one or more of, and in an embodiment all of: a command that submits a processing task to the processing resource for execution and a command to wait for a processing task or tasks to be completed. In these arrangements, each time one of the particular commands completes, the progress counter would be incremented.

In an embodiment, commands in the command stream can indicate whether the progress counter is to be incremented or not in response to that command (e.g. completing). This would then allow the operation to selectively indicate which commands are to increment the progress counter for a command stream. Such an indication can be provided as desired, for example by including a flag (a bit) in the command encoding in the command stream that indicates whether the progress counter is to be incremented or not.

In an embodiment, the progress count operation (and its incrementation) is used both when preparing the command streams (such that as commands are added to a command stream, the progress counter for the command stream is appropriately incremented and the current value of the progress counter for the command stream is tracked as the command stream is being prepared), and, correspondingly, when the processing resource is executing the command streams (such that the progress counter for a command stream is incremented appropriately when the processing resource is executing a command stream, so as to track the position in the command stream that the processing resource has reached when executing the command stream).

The host processor can prepare the plurality of command streams for the processing resource in response to a request for processing to be performed by the processing resource from an application in any suitable and desired manner. In an embodiment, the host processor adds respective commands to a respective command stream to cause the processing resource to perform the desired processing tasks. The host processor should add commands to a given command stream appropriately, e.g., in dependence upon the processing tasks required, as discussed above. For example, the processor may add commands for a particular type or types of processing task to one command stream, and commands for a different type or types of processing task to another command stream.

For example, in the case of a graphics processor, in an embodiment, the host processor will prepare one command stream that includes a sequence of commands to cause the graphics processor to perform geometry tasks (jobs), and another command stream including a sequence of commands to cause the graphics processor to perform compute tasks (compute jobs), in an embodiment compute jobs that are to perform tessellation operations.

As discussed above, in an embodiment, the host processor is configured, as it is preparing the command streams, to, for a (and for each) command stream that is being prepared, track the current position that has been reached in the command stream (i.e. the latest command added to the command stream). As discussed above, this is, in an embodiment, done by maintaining a progress counter that tracks how many commands (or at least commands of a particular type or types) have been included in the command stream. Thus the host processor in an embodiment increments a progress counter as it adds, e.g. particular, commands to a command stream (and in an embodiment does this for each command stream that it is preparing).

Thus, in an embodiment, the host processor will progressively add commands to a (and to each) command stream for causing the processing resource to perform desired processing tasks for an application, and while doing so, for each command stream, keep track of the current position in the command stream that has been reached (in an embodiment by maintaining a progress counter value for the command stream). Thus when an appropriate command is added to a command stream, the host processor will also appropriately increment a progress counter value for the command stream, so as to keep track of the current position that has been reached in that command stream.

As well as adding commands appropriately to different command streams to cause the processing resource to perform the desired processing tasks, as discussed above the host processor is also able to include appropriate wait commands in a command stream in the event that a processing task in one command stream has a dependency on a processing task or tasks that will be included in another, different command stream (i.e. when there is an inter-command stream dependency). Such a dependency could, and in an embodiment does, arise when a processing task in one command stream requires results from a processing task or tasks in another command stream before it can be performed, and/or when it is desired to delay starting a processing task (even if there is no strict dependency on data), e.g. to reduce the risk of data produced by the task from being evicted from a cache.

Thus, in an embodiment, the host processor is configured to (and the method comprises) determine whether a processing task to be added to a command stream has a dependency on a processing task or tasks that will be included in another command stream, and to, when it is determined that a processing task to be added to a command stream has a dependency on a processing task or tasks that will be included in another command stream (i.e. an inter-command stream dependency exists), include an appropriate "progress" wait command in the command stream that includes the processing task that has a dependency on a processing task or tasks in another command stream. The host processor may, e.g., identify any dependencies itself, or these may, e.g., also or instead be specified by the application that requires the processing in question.

The Applicants have recognised in this regard that when a processing task in one (in a first) command stream has a dependency upon a processing task in another command stream, then it will, e.g., be necessary for the processing task or tasks in the another command stream to be completed before the processing task in the first command stream can be executed. In this case therefore, a "progress" wait command that will cause the processing resource to delay executing any further commands in the first command stream until the processing resource has completed the processing task or tasks in the another command stream in question is added to the first command stream before (and in an embodiment immediately before) the commands for the processing task that is dependent on the processing task or tasks in the another command stream.

As discussed above, the "progress" wait command should, and in an embodiment does, identify the another command stream that includes the processing task or tasks that the task in the first command stream is dependent on, and a position (e.g., and in an embodiment, the appropriate progress counter value) in that another command stream that is after (e.g., and in an embodiment, that is immediately after) the processing task or tasks in the another command stream that the processing task in the first command stream is dependent upon (i.e. so as to delay the execution of the dependent processing task in the first command stream until the required processing task or tasks of the another command stream have been completed).

The position in the another command stream that the first command stream (that includes the wait command) should wait for can be identified in any suitable and desired manner. For example, if the processing task or tasks in the another command stream have already been included in that command stream, then the value of the progress counter for that another command stream that has already been reached (and/or at the end of the processing task or tasks in question) (if that has been tracked) could be used for the wait command.

Alternatively or additionally, the host processor could operate to, before adding the "progress" wait command to the first command stream, add the appropriate commands to perform the processing task or tasks that the processing task in the first command stream are dependent on to the another command stream (while tracking the position (e.g. progress counter value) in that another command stream), so as to determine the position (e.g. progress counter value) in the another command stream that will be reached in the another command stream once the relevant processing task or tasks in the another command stream have been completed (and that thereby should be indicated for the "progress" wait command).

In an embodiment, a command to wait for the completion of the processing task or tasks in the another command stream is included in the another command stream after the commands for executing the processing task or tasks, so that once that "completion wait" command is executed, it will be known that the processing task or tasks in the another command stream that the processing task in the first command stream is dependent upon have (definitely) been completed. The position that the first command stream is to wait for can then be (and, in an embodiment, is) indicated as the position (the progress count) after that "completion wait" command has been executed. This will then allow the completion of the processing task or tasks in the another command stream (and the position in that command stream that will be reached once those tasks have been completed) to be more readily determined.

In this case therefore, the "progress wait" command in the manner of the technology described herein will be used in conjunction with a "completion wait" command that will be used to increment the progress counter for the (another) command stream, so as to ensure that the "progress wait" command will wait correctly for the tasks in the another command stream to be completed before the dependent tasks in the command stream that includes the "progress wait" command are executed.

The Applicants have further recognised that where a processing task in one command stream is dependent upon (the completion of) one or more processing tasks in another command stream, it would be, in embodiments, desirable, if possible, to try to ensure that the processing task or tasks in the other command stream are completed in advance of, but in an embodiment not too far in advance of, the processing task in the first command stream that is dependent upon them (e.g. requires their results). This is so as to try to ensure, e.g., that the results of the processing task or tasks in the other command stream are available when the processing task in the first command stream is to be performed, but equally that those results are, in an embodiment, present in more local memory, such as a cache or caches, of the processing resource (in contrast, e.g., to having been written into main memory and therefore requiring to be fetched back into more local memory from the main memory before they can be used).

Thus, the Applicants have recognised that it would be, in embodiments, desirable to control triggering of the performance of a processing task or tasks that another command stream is dependent on (e.g. whose results are required) relative to the processing task that is dependent on that processing task or tasks, e.g., and in an embodiment, such that the results of the processing task or tasks in the another command stream are still present in (and available in) local memory of the processing resource when the processing task that is dependent on that processing task or tasks (e.g. that requires those results) is to be executed.

The Applicants have further recognised that this can be achieved by also including an appropriate "progress wait" command in the another command stream that is to include the processing task or tasks on which the processing task in the first command stream is dependent, so as to trigger the execution of those processing tasks at an appropriate point in advance of the processing task in the first command stream that is dependent on the processing task or tasks in the another command stream.

Thus, in an embodiment, when a processing task to be added to a (first) command stream has a dependency on a processing task or tasks in another command stream (i.e. there is an inter-command stream dependency), a "progress wait" command is also included in the another command stream that will cause the processing resource to delay executing the subsequent commands (after the wait command) in the another command stream until the processing resource has reached a particular position in the (first) command stream that includes the processing task that has a dependency on a processing task or tasks in the another command stream). The progress wait command in the another command stream should be, and in an embodiment is, included in the another command stream before the commands for performing the processing task or tasks that the processing task in the first command stream is dependent on.

Thus, in an embodiment, the host processor will also include a progress wait command of the technology described herein in the another command stream before the commands for the processing task or tasks in the another command stream that the processing task in the first command stream is dependent upon, so as to trigger the execution of the processing task or tasks in the another command stream (only) once the processing resource has reached a particular position in the first command stream that includes the processing task that is dependent upon the processing task or tasks in the another command stream.

This will then cause the execution of the processing task or tasks that the processing task in the first command stream is dependent on to be delayed until (and to be triggered by) the processing resource reaches a particular position in that first command stream. In this way, the execution of the dependent processing tasks can be more readily, and more efficiently, synchronised.

Thus, in an embodiment, when a processing task to be added to a command stream of the plurality of command streams has a dependency on a processing task or tasks that will be included in another command stream of the plurality of command streams, the host processor, as well as including a "progress wait" command in the command stream that is to include the processing task that has a dependency on a processing task or tasks that will be included in another command stream, also includes such a "progress wait" command in the another command stream that includes the processing task or tasks that the first command stream has a dependency on that will cause the processing resource to delay executing subsequent commands in the another command stream, until the processing resource has reached a particular position in the first command stream that includes the processing task that has a dependency on a processing task or tasks that will be included in the another command stream.

Correspondingly, in an embodiment, the method of the technology described herein comprises (and the host processor is configured to):

determining that a processing task to be added to a first command stream of the plurality of command streams has a dependency on a processing task that will be included in another command stream of the plurality of command streams;

and in response thereto:

including in the first command stream a wait command that will cause the processing resource to delay executing subsequent commands for the processing task in the first command stream until the processing resource has reached a particular position in the another command stream; and including in the another command stream a wait command that will cause the processing resource to delay executing the subsequent commands in the another command stream until the processing resource has reached a particular position in the first command stream.

The particular position in the first command stream that the (progress) wait command in the another command stream indicates should be, and in an embodiment is, a position in the first command stream that is before the processing task in the first command stream that is dependent upon the processing task or tasks in the another command stream. In an embodiment, the particular position in the first command stream to wait for is a position that is one or more processing tasks before the processing task in the first command stream that is dependent upon the processing task or tasks in the another command stream, so as to allow time for the processing task or tasks in the another command stream to be completed before the processing task in the first command stream that is dependent upon that processing task or tasks is reached.

How far in advance of the processing task that is dependent upon the processing task or tasks in the another command stream the processing task or tasks in the another command stream are triggered can be determined as desired, e.g., based on predetermined (e.g. from testing and benchmarking) processing task timings and execution conditions and parameters for the data processing system in question. In general it is, in embodiments, desirable for the processing task or tasks to be triggered a few (e.g. one or two) processing tasks before the processing task that is dependent upon the processing task or tasks in the another command stream.

The determination of the position in the first command stream to wait for and the indication of that position can be achieved in any suitable and desired manner. This may be achieved, for example, and in an embodiment, by subtracting a particular, e.g. predetermined, in an embodiment selected, value from the current value of the progress counter for the first command stream, so as to trigger the execution of the processing task or tasks in the other command stream in advance of the current position that has been reached in the first command stream.

In an embodiment, when a processing task to be added to a (first) command stream of the plurality of command streams has a dependency on a processing task or tasks that will be included in another command stream of the plurality of command streams, the method comprises (and the host processor is configured to):

adding a wait command that will cause the processing resource to delay executing subsequent commands until the processing resource has reached a particular position in the first command stream to the another command stream that is to include the processing task or tasks that the processing task in the first command stream is dependent upon;

adding to the another command stream after the wait command, one or more commands to execute the processing task or tasks in the another command stream that the processing task in the first command stream is dependent on, in an embodiment followed by a command to identify the completion of the processing task or tasks in the another command stream that the processing task in the first command stream is dependent on;

adding to the first command stream a wait command that will cause the processing resource to delay executing subsequent commands in the first command stream until the processing resource has completed the processing task or tasks in the another command stream that the processing task in the first command stream is dependent on; and adding to the first command stream after that wait command, one or more commands to cause the processing resource to perform the processing task that is dependent upon the processing task or tasks in the another command stream.

Thus, in an embodiment, in the case of a graphics processor and a tessellation operation, the host processor prepares (at least) two command streams, a geometry task command stream and a compute task command stream, and in an embodiment identifies when a tessellation draw call occurs, and in that case:

adds a wait command that waits for a particular position in the geometry task command stream to the (tessellation) compute task command stream;

then adds to the compute task command stream after the wait command, commands to execute the tessellation compute tasks and, in an embodiment, thereafter an instruction to identify the completion of the tessellation compute tasks;

adds a wait command to the geometry task command stream before adding the tessellation geometry task to the geometry task command stream so as to cause the tessellation geometry task in the geometry task command stream to be deferred until the compute task command stream tessellation compute tasks have been completed.

The above discusses in particular the preparation of the command streams when there is an inter-command stream dependency. It can also be the case that processing tasks included in the same command stream have dependencies on each other (i.e. there are intra-command stream dependencies). Such an arrangement can be, and in an embodiment is, addressed by ordering the processing tasks (and the commands for the processing tasks) in an appropriate order in the command stream in question.

The preparation of the command streams by the host processor can be performed by any suitable and desired element and component of the host processor. In an embodiment, a driver for the processing resource in question prepares the command streams (and accordingly operates in the manner of the technology described herein). Thus in an embodiment, the command stream generating circuit comprises programmable processing circuitry/circuit(s) that can be programmed (e.g. and in an embodiment to operate as a driver for the processing resource) to prepare the command streams in the desired manner.

Thus, a further embodiment of the technology described herein comprises a driver for a processing resource of a data processing system that is configured to perform processing tasks for applications executing on a host processor of the data processing system, the driver being configured to:

prepare, in response to a request for processing to be performed by the processing resource from an application, a plurality of command streams to cause the processing resource to perform processing tasks for the application, each command stream including a sequence of commands to cause the processing resource to perform processing tasks;

wherein preparing the command streams comprises:
when a processing task to be added to a command stream of the plurality of command streams has a dependency on a processing task or tasks that will be included in another command stream of the plurality of command streams:
including in the command stream that is to include the processing task that has a dependency on a processing task or tasks that will be included in another command stream, a wait command that will cause the processing resource to delay executing subsequent commands in the command stream that includes the wait command, until the processing resource has reached a particular position in the another command stream.

Once the command streams, including any appropriate (progress) wait commands, have been prepared by the host processor, the command streams are provided to the processing resource, e.g. graphics processor, for execution, and the processing resource, e.g. graphics processor, will then execute the command streams appropriately.

The command streams can be provided to the processing resource, e.g. graphics processor, in any suitable and desired manner. For example, they may be stored in appropriate command stream storage, such as buffers, from where the commands can be read appropriately by the processing resource for execution. Other arrangements would, of course, be possible.

The execution of the command streams by the processing resource can be configured and implemented in any suitable and desired manner. For example, the processing resource may include an appropriate supervising controller, such as a microcontroller, that is configured to handle the scheduling of the command streams on the hardware execution resources of the processing resource (and in an embodiment, this is the case). Other arrangements would, of course, be possible.

Correspondingly, in an embodiment, hardware execution resources of the processing resource include a plurality of command stream execution units configured to execute (and that execute) commands in a command stream so as to perform processing tasks for an application.

The processing resource, e.g. graphics processor, can correspondingly execute the command streams in any suitable and desired manner. The execution of the plural command streams is, in an embodiment, started simultaneously, with the processing resource, e.g. graphics processor, then processing the commands in each command stream appropriately in turn (and in parallel where the processing resource has the capability to do that and that is appropriate) (and in accordance with and on the basis of any wait commands that are included in a command stream).

Thus, in an embodiment, the processing resource will execute commands in the command streams in turn (and in order), and as it does so will, for a (and for each) command stream that it is executing, track its progress through (along) the command stream (the position that it has currently reached in the command stream), for example, and in an embodiment, by maintaining a progress count for the command stream that is (in an embodiment) automatically incremented when command stream commands that are to increment the progress counter are executed. The current command stream position (progress count) could, e.g., be maintained in an appropriate register of or accessible to the processing resource.

Correspondingly, when the processing resource encounters a (progress) wait command in a command stream that it is executing, it will identify from the (progress) wait command the other command stream that the execution of the current command stream is to wait for, and the particular position (e.g., and, in an embodiment, progress count) that the command stream has to reach for execution of the current command stream to continue.

In response to such a wait command, the processing resource accordingly, in an embodiment, operates to determine whether the indicated particular position has already been reached in the another command stream, and, if so, simply continues with execution of commands in the current command stream. On the other hand, if the indicated position in the another command stream has not yet been reached, then execution of the current command stream is stopped until the indicated position in the another command stream has been reached.

The determination of whether and when the indicated position in another command stream for a (progress) wait command has been reached can be performed in any suitable and desired manner.

In one embodiment, as well as maintaining for a (and each) command stream an indication (e.g. a progress count) of the position that has currently been reached in that command stream, a record is also maintained of any position in the command stream that another command stream is waiting on.

In this case therefore there will be two "positions" ("progress counts") maintained (e.g., and, in an embodiment, in registers) for a (and each) command stream that is being executed: a first position (progress count) that tracks the position that has been reached in the command stream; and a second, "comparison" position (progress count) that indicates the position (the progress count) for the command stream to be reached for another command stream that is waiting for the command stream in question to continue its execution. The "comparison" position (progress count) is accordingly, in an embodiment, able to be set, and set, in use, to the appropriate position (e.g. progress count value) indicated in a (progress) wait command in another command stream (in response to a (progress) wait command in another command stream).

In these arrangements, when the "compare" position (progress count value) has been set for a command stream, then that "compare" position is, in an embodiment, periodically and continuously compared to the position that has been reached in the command stream, until it is determined that the "compare" position (progress count) has been reached in the command stream (in which case the operation then proceeds to restart execution of the commands in the waiting command stream).

The actual mechanism for restarting command stream execution when the appropriate position in another command stream is reached can be implemented and configured as desired. For example, this could be done under the control of a supervising controller (microcontroller), with, for example, an interrupt to the controller being generated when the current "compare" position (progress count value) is reached for a command stream, with the controller in response to such an interrupt then (e.g. under software control) identifying which (progress) wait command has been met and restarting the execution of the corresponding command stream at the next command after the (progress) wait command.

Thus, in an embodiment, the processing resource comprises:

a plurality of command stream execution units configured to execute commands in a command stream so as to perform processing tasks for an application; and a controller configured to control the execution of command streams by the command stream execution units;

and the method further comprises (and the command stream execution units and controller are configured to):

each command stream execution unit maintaining for a command stream that it is executing, a record of the position that has currently been reached in the command stream, and a record of a position in the command stream that another command stream is waiting on;

and when a command stream execution unit encounters a wait command in a command stream that it is executing, the command stream execution unit signalling to the controller; and the controller, in response to the signal from the command stream execution unit:

identifying that a wait command has been encountered by the command stream execution unit;

identifying from the wait command, the another command stream that the execution of the command stream is to wait for, and the particular position in the another command stream to be reached for execution of the command stream that includes the wait command to continue;

determining whether the particular position has already been reached in the another command stream; and when the particular position in the another command stream has already been reached, signalling the command stream execution unit to continue with execution of commands in the command stream that included the wait command.

In one such embodiment, the controller, when the particular position in the another command stream has not yet been reached:

sets the record of a position that another command stream is waiting on for the another command stream in which a particular position has to be reached for execution of the command stream that includes the wait command to continue, to the particular position to be reached in that another command stream for execution of the command stream that includes the wait command to continue; and configures the command stream execution unit that is executing the another command stream that the execution of the command stream containing the wait command is to wait for, to signal to the controller when the set position in the another command stream has been reached;

and the command stream execution unit for the another command stream, when it reaches the set position in its execution of the another command stream, signals to the controller; and the controller in response to that signal, identifies for which wait command the particular position in another command stream has been reached, and signals the command stream execution unit for the command stream that included the wait command whose particular position has been reached to restart the execution of the command stream that includes the wait command.

In these arrangements, the command stream supervising controller, e.g. microcontroller, could also be used to handle exceptions to the operation, such as when a command stream to wait on is not currently scheduled on a hardware execution resource, and/or cases where more than one command stream is waiting on the same command stream.

In another embodiment, rather than maintaining a "compare" position (progress count) for each command stream, when a (progress) wait command is encountered in a command stream, the indicated wait position in the (progress) wait command is compared to the current position (e.g. progress count value) that has been reached for that other command stream that is to be waited on, and if the current position for the other command stream is greater than or equal to the position indicated for the (progress) wait command, then execution of the command stream that included the (progress) wait command is continued, but if not, execution of the command stream that included the (progress) wait command is stopped.

Thus, in an embodiment the processing resource comprises:

a plurality of command stream execution units configured to execute commands in a command stream so as to perform processing tasks for an application; and a controller configured to control the execution of command streams by the command stream execution units;

and the method further comprises (and the command stream execution units are configured to):

each command stream execution unit maintaining for a command stream that it is executing, a record of the position that has currently been reached in the command stream; and when a command stream execution unit encounters a wait command in a command stream that it is executing, the command stream execution unit:

identifying from the wait command, the another command stream that the execution of the command stream is to wait for, and the particular position in the another command stream to be reached for execution of the command stream that includes the wait command to continue;

determining from the record of the position that has currently been reached in the command stream that is being maintained by the command stream execution unit that is executing the identified another command stream, whether the particular position has already been reached in the another command stream; and when the particular position in the another command stream has already been reached, continuing with execution of commands in the command stream that includes the wait command;

when the particular position in the another command stream has not yet been reached, stopping execution of the command stream that included the wait command until the particular position in the another command stream has been reached.

In this case, the (progress) wait command (and the check of the current position of the command stream that is being waited on) could again periodically be retried, e.g. at particular intervals, but in an embodiment, the (progress) wait command is only retried in response to a particular, in an embodiment selected, in an embodiment predefined, event or events occurring.

Thus, in an embodiment, a command stream execution unit that encounters a wait command in the command stream that it is executing, when the particular position in the another command stream has not yet been reached:

retries the determining from the record of the position that has currently been reached in the command stream that is being maintained by the command stream execution unit that is executing the identified another command stream, whether the particular position has already been reached in the another command stream, in response to a particular event or events occurring.

In one embodiment, the check on the current position that has been reached in the command stream that is being waited on is (only) retried when the current position (e.g. progress count) for a command stream is updated (incremented). In this case, the (progress) wait command could be checked again if the position (progress count) for any command stream is updated, or the operation could be such that the (progress) wait command is only tried again if the position (progress count) for the particular command stream that is being waited on is updated.

In an embodiment, the (progress) wait command is also retried in the event that there is a change in the identity of the command streams that are being executed by the processing resource. This may be particularly applicable in the situation where the processing resource, e.g. graphics processor, can only execute fewer command streams in parallel than the total number of command streams that have been prepared and are to be executed. In this case, the command stream execution scheduling may change the command streams that are currently being executed (e.g. for scheduling purposes), thereby changing the set of command streams that are currently being executed. In this case, it could be that the command stream that is being waited on is either made active (when it wasn't previously being executed), or vice-versa (is made inactive). At least in the former case, if the command stream that is being waited on is now being executed when it wasn't previously, it would be appropriate to retry the (progress) wait command in the command stream that is waiting for that command stream, as there will now be progress of execution in the command stream that is being waited on.

To facilitate this operation (and otherwise), in an embodiment, as well as maintaining a record of the current position (progress count) that has been reached in a command stream that is being executed, that position indication (progress count) is also associated with an identifier for the command stream in question (which identifier should, and in an embodiment does, match the identifier that will be used in a (progress) wait command to identify the command stream that is being waited on). In this case, when a (progress) wait command is encountered in a command stream, the process, in an embodiment, first operates to determine whether there is any currently active command stream having the same command stream identifier as the identifier used to indicate the command stream to wait on in the (progress) wait command. This will then allow the command stream that is being waited on to be identified.

If, when a (progress) wait command is encountered, it is determined that the command stream that is being waited on is not currently being executed, then the execution of the command stream including the (progress) wait command should be, and in an embodiment is, stopped. In an embodiment, in this arrangement an appropriate signal, e.g. interrupt, to a command stream execution supervisor (e.g. microcontroller) is issued, so as to allow that special case (exception) to be handled appropriately (for example by scheduling the command stream that is being waited for to now be executed).

In an embodiment, when execution of a command stream is stopped because the execution is waiting on another command stream, an indication of that (e.g. an interrupt) is, in an embodiment, sent to a command stream execution supervisor, e.g., microcontroller, so as to indicate that the command stream in question is currently "blocked". This would then allow, for example, the command stream execution supervisor to schedule an alternative command stream for execution in place of the "blocked" command stream, e.g. in arrangements where the processing resource is only able to execute fewer command streams in parallel than the total number of command streams that are to be executed. Such an indication may be configured, e.g., to only be generated the first time the (progress) wait command is tried, if desired.

Thus, in an embodiment a command stream execution unit that encounters a wait command in the command stream that it is executing, when it determines from the record of the position that has currently been reached in the command stream that is being maintained by the command stream execution unit that is executing the identified another command stream, that the particular position in the another command stream has not yet been reached:

signals to the controller configured to control the execution of command streams by the command stream execution units that the execution of the command stream that included the wait command has been stopped.

The above describes in particular the operation in the manner of the technology described herein when there are inter-command stream dependencies. It would also be possible in some circumstances for there to be no inter-command stream dependencies for a processing operation that the processing resource is to perform (e.g. where there are no processing tasks of different types with inter-dependencies to be executed). In that case, there would not be any need to use progress wait commands in the manner of the technology described herein, and, e.g., it would be possible to prepare and execute only a single command stream, if desired.

The technology described herein can be used for all forms of output that a processing resource of a data processing system may be used to generate. For example, in the case of graphics processing, the graphics processor may generate frames for display, render-to-texture outputs, etc. The output data values from the processing are, in an embodiment, exported to external, e.g. main, memory, for storage and use, such as, in the case of graphics processing, to a frame buffer for a display.

In some embodiments, the data processing system comprises, and/or is in communication with, one or more memories and/or memory devices that store the data described herein, and/or store software for performing the processes described herein. The data processing system may also comprise or be in communication with a display for displaying images based on the data generated by the data processing system.

The technology described herein is applicable to any suitable form or configuration of processor or data processing system. It is particularly applicable to tile-based graphics processors and graphics processing systems. Thus in an embodiment, the data processing system and processing resource are a tile-based graphics processing system and processor, respectively.

In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, circuitry, circuit(s), and "means" of the technology described herein may comprise a suitable processor or processors, controller or controllers, functional units, circuitry, circuit(s), processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that, when viewed from further embodiments, the technology described herein comprises computer software specifically adapted to carry out the methods herein described when installed on a data processor, a computer program element comprising computer software code portions for performing the methods herein described when the program element is run on a data processor, and a computer program comprising computer code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, from a further broad embodiment, the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that the techniques for synchronising the execution of processing tasks described herein can be used in non-graphics contexts as well.

FIG. 1 shows an exemplary graphics processing system. An application 2, such as a game, executing on a host processor 1 will require graphics processing operations to be performed by an associated graphics processing unit (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

In the present embodiments, the appropriate commands and data for performing the processing tasks required by the application 2 are provided to the graphics processor 3 in the form of one or more command streams, that each include sequences of commands (instructions) to cause the graphics processor to perform desired processing tasks.

The command streams are prepared by the driver 4 on the host processor 1 and may, for example, be stored in appropriate command stream buffers, from where they can then be read by the graphics processor 3 for execution. Each command stream will contain commands (instructions) to set parameters for graphics processor tasks, as well as commands (instructions) to execute a task, etc.

Figure 2:
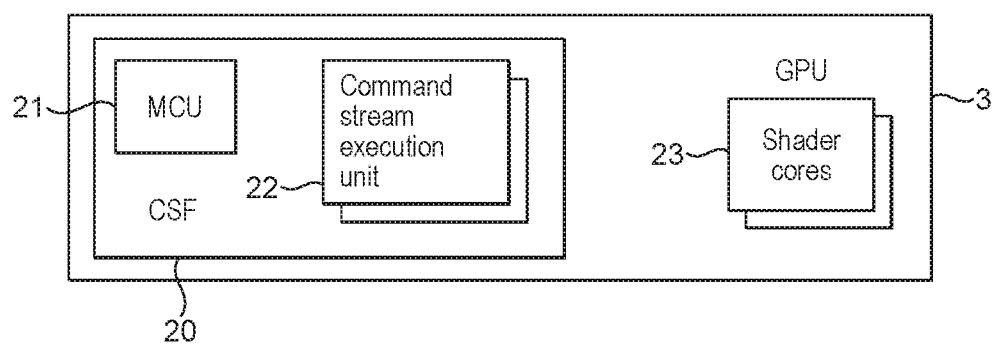
FIG. 2 shows schematically a graphics processor that can be operated in the manner of the technology described herein.

In order to facilitate this operation, the graphics processor 3 includes, as shown in FIG. 2, a command stream frontend 20 that includes a command stream supervisor (controller) 21 (in the form of a microcontroller) that is configured to schedule and issue commands from the command streams to respective command stream execution units 22. The command stream execution units 22 then execute the commands in the respective command streams to trigger the processing execution units 23 of the graphics processor (which in the present example are shown as being a plurality of shader cores, although other arrangements would, of course, be possible) to perform the desired processing tasks.

Embodiments of the command stream preparation and execution in the manner of the technology described herein will now be described with particular reference to the processing of tessellated geometry on the graphics processor 3.

In these embodiments, it is assumed that an ordinary graphics draw call (without tessellation) results in a single geometry task for the graphics processor 3. On the other hand, a draw call with tessellation will result in a number (e.g. about 10) of serially dependent compute tasks to generate the tessellated geometry, followed by a single geometry task to process the so-generated tessellated geometry. There will also typically be a serial dependency between geometry tasks in that they have to be executed in the same order as the graphics API draw calls.

Figure 3:
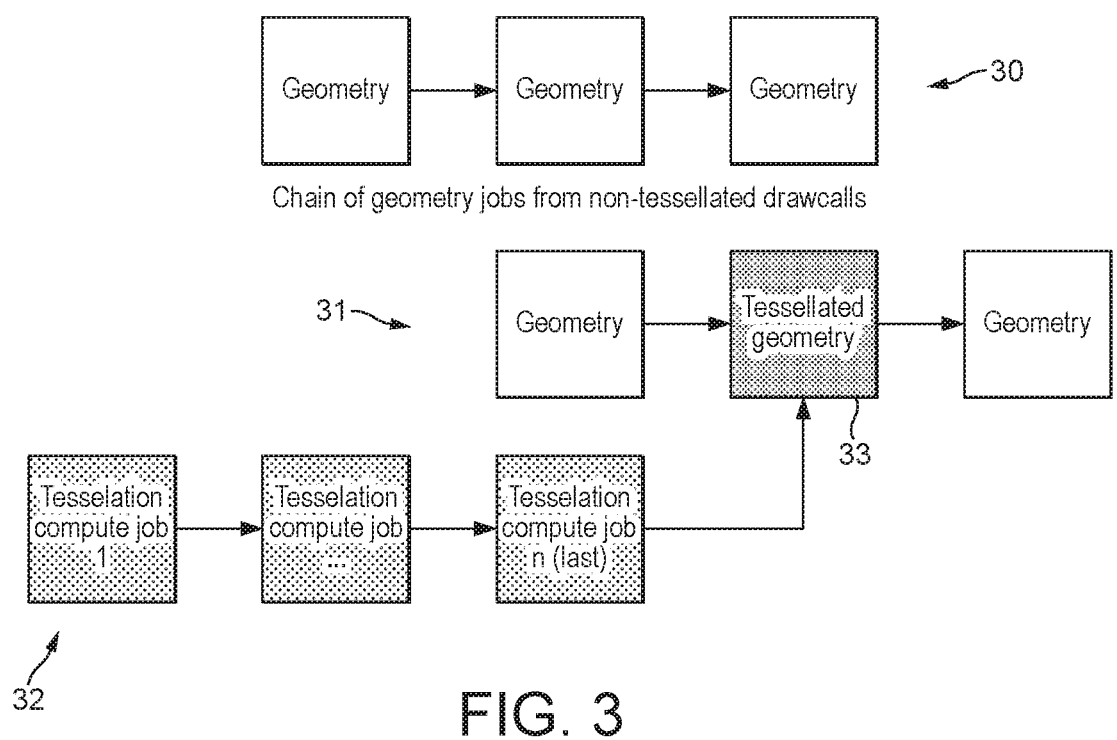
FIG. 3 shows schematically command streams for execution by a graphics processor.

FIG. 3 illustrates this, and shows both a chain 30 of geometry tasks from non-tessellated draw calls, and a chain 31 of geometry tasks that includes a tessellated draw call. It can be seen in the latter case where there is a tessellated draw call, that as well as the chain of geometry tasks 31 including the tessellated geometry task 33, there will also be a corresponding chain of tessellation compute jobs 32 that need to be completed before the tessellated geometry task 33.

In such arrangements where there is some tessellation processing to be done, then the tessellation compute tasks 32 could simply be included in the overall geometry task chain 31 in the desired order. However, that may lead to reduced throughput due to low loading on the graphics processor 3, as the tessellation compute tasks typically don't have enough work items to fully utilise the graphics processor and can run for a relatively long time.

The present embodiments address this by using a second command stream for the tessellation compute tasks, and synchronising the execution of the two command streams using "progress wait" commands.

Thus, in the present embodiments, when there is a possibility that tessellation will be required, the driver 4 prepares a geometry command stream that is used for the geometry tasks for the graphics processor 3, and a separate compute task command stream that is used for the tessellation compute tasks.

Each command stream has an associated progress counter that is used to track the position that has been reached in the respective command stream. In the present embodiments, the progress counter is incremented when a "significant" command is added to/completed in a command stream, such as a command to submit a task to the graphics processor and a command to determine that a graphics processor task has been completed. The encoding of the "significant" commands that increment the progress counter for a command stream includes a bit that indicates if the progress counter is to be incremented or not.

In addition, the driver can also include in a command stream a "progress_wait" command that causes the execution of the command stream that includes that command to wait on another, different command stream. The progress wait command takes two parameters, the identity of the other command stream to wait for, and the minimum value of the progress counter for that command stream to wait for (i.e. the position in that other command stream that must be reached before execution of the command stream that includes the progress wait command is continued). These progress wait commands facilitate, as will be discussed further below, synchronising the execution of commands and processing tasks in the different command streams.

Thus, in the present embodiments, when an application requires processing of a draw call with no tessellation, the graphics processor driver 4 will add appropriate commands for the draw call to the geometry command stream, but when there is a draw call with tessellation, the driver 4 will add commands for the tessellation compute tasks to the compute task command stream, and add the geometry processing for the draw call to the geometry command stream.

Figure 4:
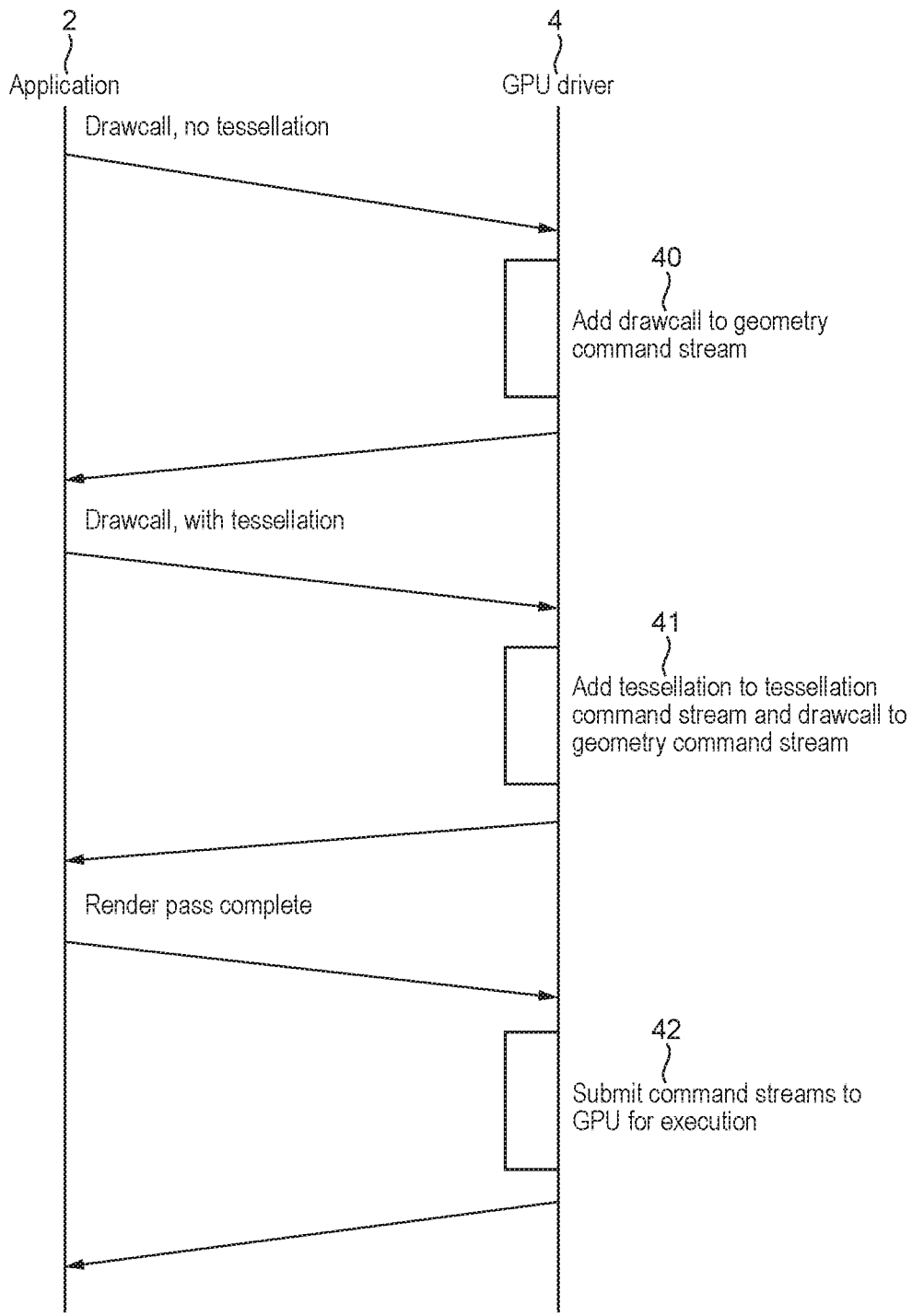
FIGS. 4, 5 and 6 show schematically the preparation of command streams for execution by a graphics processor in an embodiment of the technology described herein.

FIG. 4 illustrates this, and shows the driver 4 adding a draw call to the geometry command stream for a draw call with no tessellation 40, but for a draw call with tessellation adding tessellation tasks to the compute task command stream and a draw call to the geometry command stream 41. (As shown in FIG. 4, once the render pass in question is complete, the generated command streams are submitted 42 to the graphics processor 3 for execution.)

Figure 5:
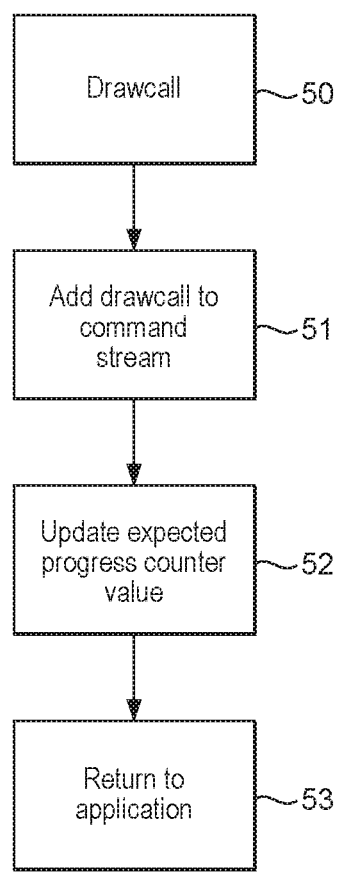

In the case of a draw call without tessellation, the driver will simply add the draw call to the geometry command stream whilst updating the progress counter for that command stream appropriately. FIG. 5 illustrates this, and shows that when the driver receives a draw call without tessellation from an application (step 50), it will then add appropriate commands for the draw call to the geometry command stream (step 51), whilst updating the progress counter for the geometry command stream accordingly (to keep track of where the driver has reached in that command stream) (step 52), and then return to the application (step 53) to await the next draw call.

In the case of a draw call with tessellation, as discussed above, the driver will add both tessellation compute tasks to the compute task command stream, and a corresponding geometry processing task to the geometry command stream. Moreover, the driver will use progress wait commands in both command streams to synchronise the execution of the tessellation compute tasks and the dependent tessellated geometry geometry processing task in the geometry command stream.

Figure 6:
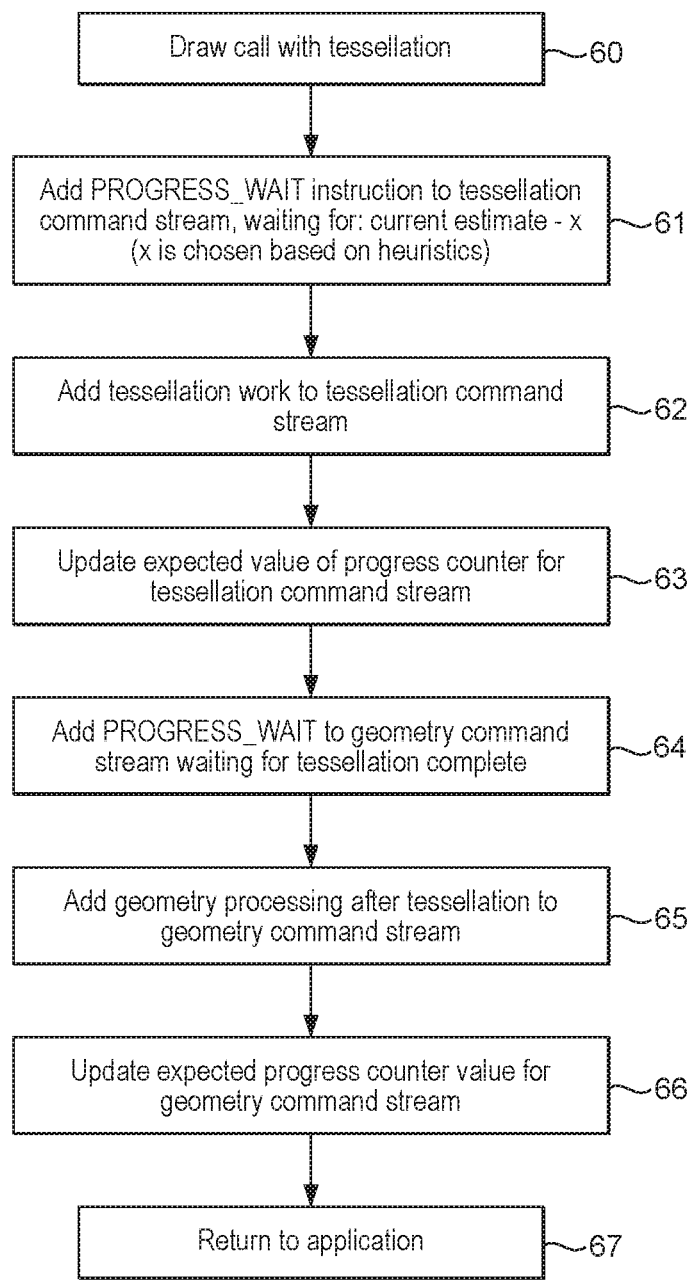

FIG. 6 is a flowchart showing this operation in more detail.

As shown in FIG. 6, when the driver receives a draw call with tessellation (step 60), it first adds a progress wait instruction to the compute task command stream, indicating that execution of subsequent commands in that command stream should wait until the graphics processor has reached a particular position in the geometry command stream (step 61). This will then cause the execution of the subsequent tessellation compute tasks in the compute task command stream to be triggered (only) when a particular position in the geometry command stream is reached.

The particular position in the geometry command stream to wait for is determined as a position that is in that geometry command stream a certain period in advance of the current position in the geometry command stream (based, e.g., on benchmarking tests), so as to trigger the execution of the tessellation compute tasks sufficiently far (but not too far) in advance of the (tessellation) geometry task that will process them (that is dependent on them). This position to wait for can be determined, for example, by subtracting a particular (e.g. predefined) value from the current progress counter value for the geometry command stream.

The driver then adds commands (instructions) to submit the tessellation compute tasks to the compute task command stream after the progress wait command, followed by a command (instruction) to wait for the tessellation compute tasks have been completed (step 62). The progress counter value (position) for the tessellation command stream is then updated to the expected count value when the tessellation tasks in question will have been completed (step 63).

The driver then adds a progress wait command to the geometry command stream to cause the geometry command stream to wait for the tessellation compute tasks to complete before executing commands in the geometry command stream after the progress wait command (step 64). In this case, the position (progress count) in the compute task (tessellation) command stream that is set for the progress wait command corresponds to the determined expected value of the progress counter for the compute task (tessellation) command stream when the tessellation compute tasks have been completed (as determined in step 63).

This progress wait command in the geometry command stream will accordingly ensure that the compute command stream tessellation compute tasks have completed before the tessellation geometry task is started.

The driver then adds the instructions for the geometry processing for the tessellation geometry task to the geometry command stream (step 65) and then updates the progress counter value for the geometry command stream accordingly (step 66) and returns to the application (step 67).

Figure 7:
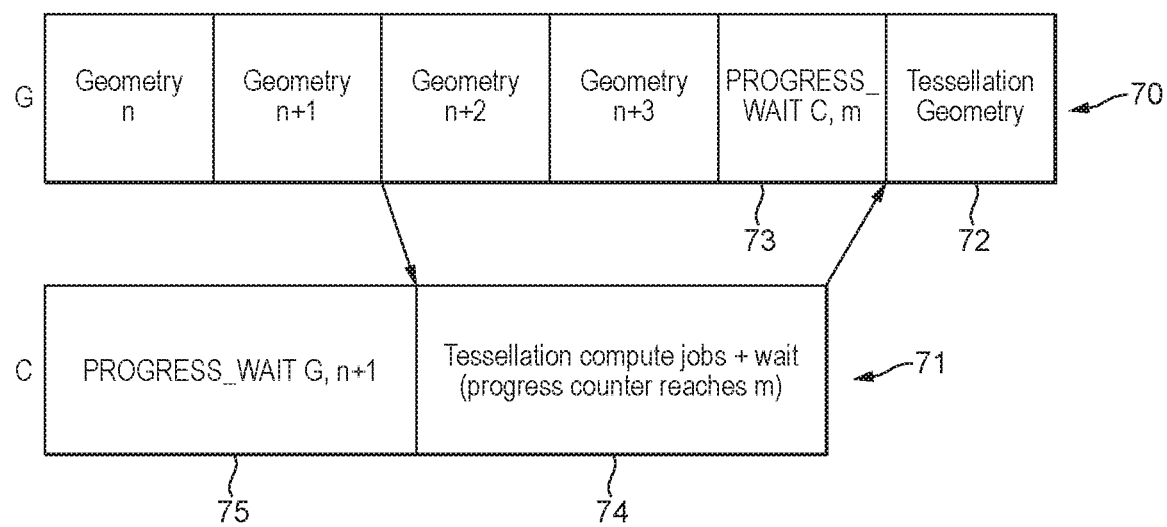
FIG. 7 shows exemplary command streams prepared in an embodiment of the technology described herein.

FIG. 7 shows exemplary geometry 70 and compute 71 command streams that have been generated in this manner.

Thus, as shown in FIG. 7, the geometry command stream 70 includes a sequence of geometry processing tasks, but before the geometry processing task 72 for the tessellated geometry, there is a progress wait command 73 that waits for the compute command stream 71 to reach a particular position (progress counter value) m.

Correspondingly, the compute task command stream 71 includes, before the tessellation compute tasks 74 that will produce the tessellated geometry, a progress wait command 75 that will operate to trigger the start of the tessellation compute tasks 74 when the geometry command stream 70 reaches a progress count n+1 that is in advance of the tessellation geometry task 72.

This will then allow the tessellation compute tasks 74 to run on the graphics processor in parallel with other geometry work in advance of the tessellation geometry task 72 that requires the results of those tessellation compute tasks 74, thereby facilitating a higher loading on the graphics processor 3. Also, the use of the progress wait commands in this way means that no extra driver overhead is added in the case where tessellation is not being used.

Once the command streams have been prepared, they are provided to the graphics processor 3 for execution. This can be done in any suitable and desired manner. For example, the driver 4 may build command stream buffers which are then called from a circular command buffer (a ring buffer), with the graphics processor execution hardware then executing the circular command buffer following the calls to the command stream buffers. Other arrangements would, of course, be possible.

When executing the command streams, the supervising microcontroller 21 handles scheduling of the command streams on the hardware execution resources (shader cores) 23 of the graphics processor 3.

In the present embodiments, the execution of the geometry task and compute task command streams is started simultaneously, with the graphics processor executing the commands in each command stream in order (and in accordance with appropriate scheduling as between commands and tasks of the different command streams via the supervising microcontroller 21 as appropriate).

When executing a command streams, the progress count for the command stream in question is automatically incremented in accordance with the commands that are indicated as incrementing the progress count when they have been executed.

Figure 8:
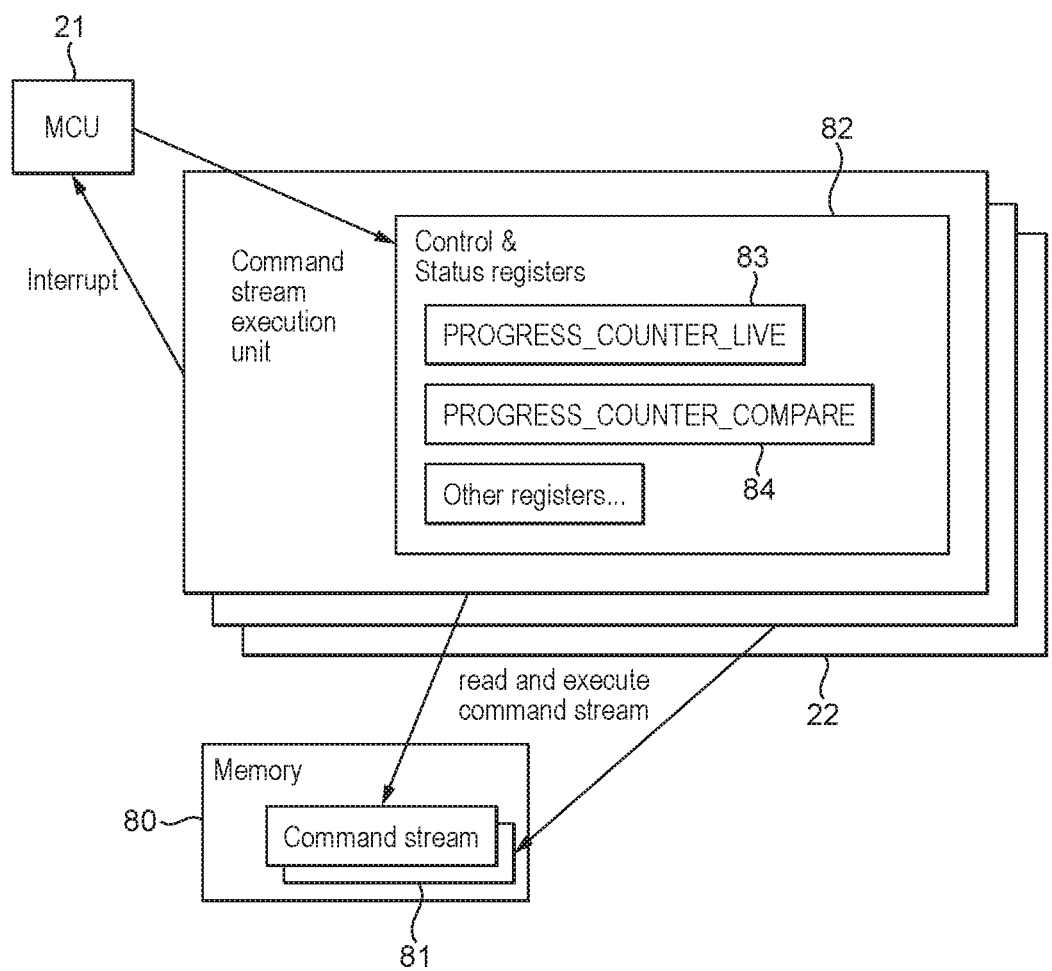
FIGS. 8 and 9 show schematically the execution of command streams by a graphics processor in an embodiment of the technology described herein.
Figure 9:
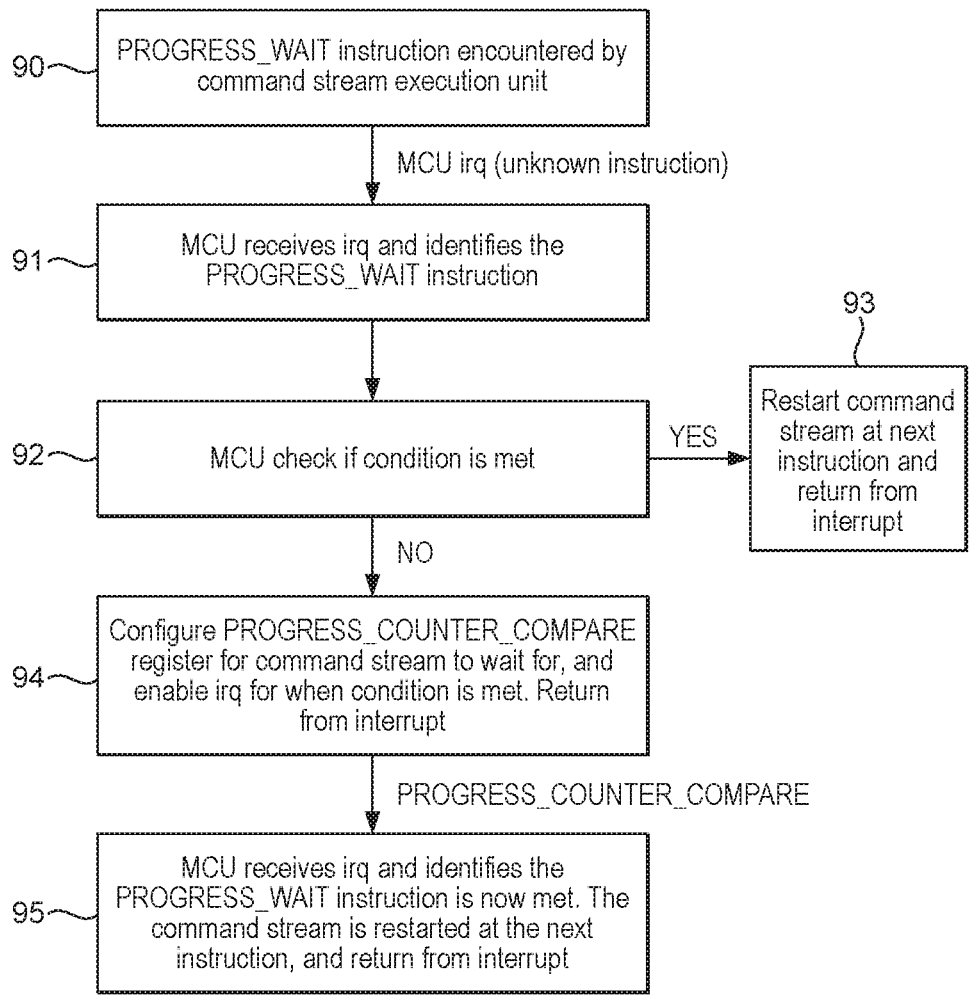

FIGS. 8 and 9 show the execution of the command stream in a first embodiment in more detail.

As shown in FIG. 8, it is assumed that the plural command streams 81 prepared by the driver 4 are appropriately stored in memory 80, with commands being read therefrom and then executed by respective command stream execution units 22 of the graphics processor 3, under the control of the supervising microcontroller 21.

In this case, in order to execute any progress wait instructions in a command stream, as shown in FIG. 8, each command stream execution unit 22 that is executing a command stream has a set of control and status registers 82, that include, inter alia, a progress_counter_live value register 83 that acts as a progress counter for the command stream in question. This register is automatically incremented when a command stream command that is to increment the progress count is executed.

Each command stream execution unit 22 also maintains a separate progress_counter_compare register 84 that, as will be discussed further below, is used to store the value of the progress count (position) for the command stream in question that another command stream is waiting on (if any). When the progress_counter_live value is greater than or equal to the progress_counter_compare value, an interrupt is generated to the microcontroller 21 to indicate that the position (progress count) that is being waited on in the command stream has been reached.

FIG. 9 shows the operation in this embodiment when a progress wait command is encountered in a command stream by a command stream execution unit.

As shown in FIG. 9, when a progress wait command (instruction) is encountered in a command stream (step 90), the command stream execution is stopped and an interrupt is generated to the microcontroller 21. The microcontroller will receive the interrupt and identify the progress wait command (step 91) and then check if the required progress count (position) has already been reached in the command stream that is being waited on (step 92). If yes, it will restart the command stream that included the progress wait command (step 93). If no, then the microcontroller 21 will set the progress_counter_compare register for the command stream that is being waited on accordingly, and enable an interrupt for when the wait position is met (step 94).

The microcontroller 21 will then return from the interrupt and the command stream execution of any command streams that are not currently waiting will be continued.

Then, when the progress_counter_compare position (progress count) for the command stream that is being waited on is reached in that command stream, an interrupt will be generated to the microcontroller 21, which will then operate to identify which progress wait command is now met, and so restart the command stream that included the progress wait command at the next command (and return from the interrupt) (step 95).

Execution of the command streams will then continue until such time as another progress wait command is encountered.

This embodiment uses the supervising microcontroller 21 for handling the progress wait operation. This provides the advantage of allowing for relatively simple hardware, and also provides the supervising microcontroller 21 with the information on when a command stream is waiting, thereby facilitating, e.g., making better scheduling decisions for the hardware execution resources.

The microcontroller can also be used to handle "exception" cases, such as when the command stream to wait on is not currently scheduled on a hardware execution resource (is not currently resident on the hardware execution resources). This could occur, e.g., in arrangements where the hardware resources for executing command streams are only able to concurrently support execution of fewer command streams than there may be to be executed in total. To allow for this possibility the microcontroller 21 could be configured to also initially check if the command stream to be waited on is resident on the hardware execution resources 23 of the graphics processor, if desired.

The supervising microcontroller 21 could also be used to handle cases where more than one progress wait instruction (from different command streams) is waiting on the same command stream (in which case, e.g., the microcontroller may, and in an embodiment does, configure the progress counter compare value for the command stream that is being waited on to the lowest value that is being waited for).

Figure 10:
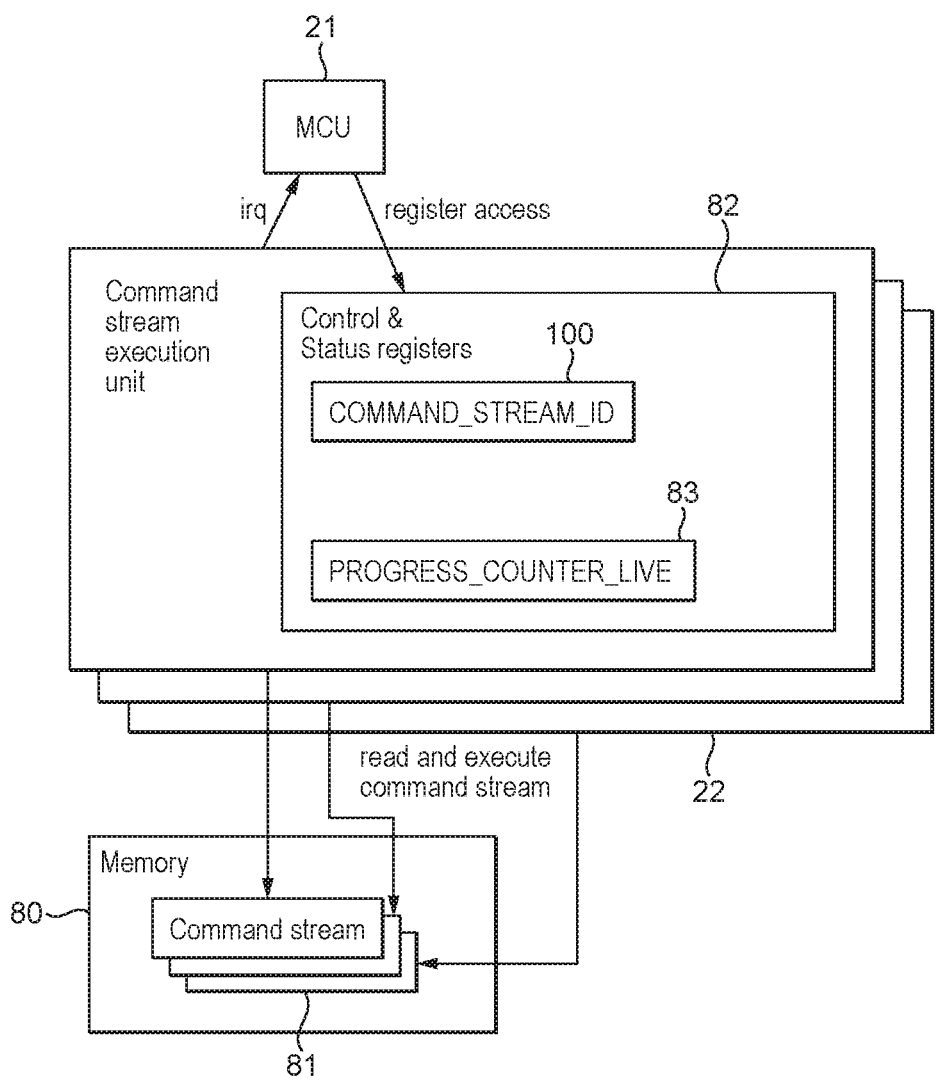
FIGS. 10 and 11 shows schematically the execution of command streams by a graphics processor in another embodiment of the technology described herein.
Figure 11:
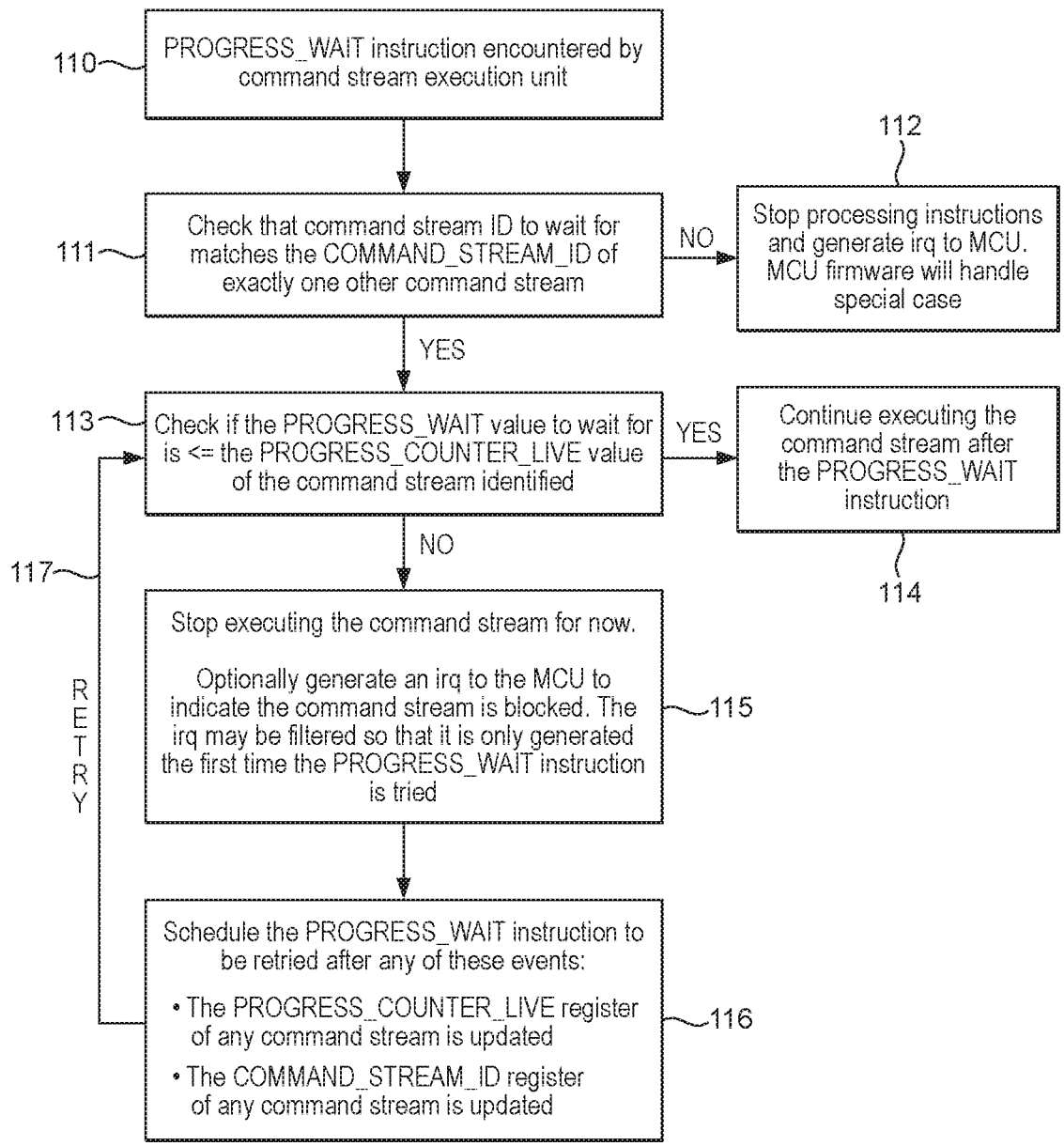

FIGS. 10 and 11 show the execution of the command streams in another embodiment in more detail.

This embodiment comprises a more complete hardware implementation for the progress counter and progress wait command mechanism, and so can reduce the involvement of the microcontroller 21 in the progress counter and progress wait command operation (which may, accordingly, e.g., reduce or avoid any latency that may be associated with such microcontroller 21 operation).

As shown in FIG. 10, in this embodiment, each command stream execution unit again maintains a set of control and status registers 82 that include, inter alia, a progress_counter_live value register 83 that acts as a progress counter for the command stream in question (and that again is automatically implemented when appropriate commands in the command stream in question are executed).

However, a progress_counter_compare register is not maintained for each command stream execution unit (for each command stream that is being executed). Rather, as shown in FIG. 10, each command stream that is executing on a hardware resource is tagged with an (unique) identifier that corresponds to the identifier that will be used in a progress wait command to identify the command stream, which command stream identifier is stored in a command_stream_ID register 100 of the command stream execution unit in question.

The operation when a progress wait command is encountered in a command stream by a command stream execution unit in this embodiment is shown in FIG. 11.

As shown in FIG. 11, when a progress wait command (instruction) is encountered in a command stream (step 110), it is first checked whether the command stream to wait for (as indicated by the command stream ID in the progress wait command) matches the command stream ID stored for one (and only one) command stream that is currently executing on the hardware execution resources (that is currently present in a command stream execution unit) (step 111). This check allows it to be determined if the command stream that is being waited on is currently resident on a hardware execution resource or not (and whether some other fault such as two command streams that are resident on the hardware execution resources both having the same ID exists).

If there is no identity match with a command stream that is resident on a hardware execution resource, then that indicates that the command stream to be waited on is not currently being executed. In this case, as shown in FIG. 11, the execution of the command stream that included the progress wait command is stopped, and an interrupt is generated to the microcontroller 21 for the microcontroller 21 to then handle the situation where the command stream being waited on is not currently being executed (step 112).

On the other hand, if there is a match with a command stream that is currently executing on a hardware execution resource (i.e. the command stream that is to be waited on is currently executing on a hardware execution resource), then the process operates to check if the progress counter value to wait for (as indicated in the progress wait command) for that other command stream is less than or equal to the current progress_counter_live value of the identified command stream (step 113). If so, execution of the command stream that included the progress wait command is continued (step 114).

On the other hand, if the progress counter value to wait for (as indicated in the progress wait command) for that other command stream is not (is other than) less than or equal to the current progress_counter_live value of the identified command stream, then the execution of the command stream that included the progress wait command is stopped (step 115).

As shown in FIG. 11, at this point it would be possible to generate an interrupt to the supervising microcontroller 21 to indicate that the command stream that included the progress wait command is currently blocked (waiting). This may assist the microcontroller 21 when scheduling command streams for execution (e.g. to allow it to reschedule the hardware execution resources if required). The condition for raising this interrupt may, e.g., take into account if it is the first time the progress wait command has been tried, or if it has been retried (e.g. so as to only generate the interrupt the first time the progress wait command is tried).

The progress wait command is then scheduled to be retried in the event that the progress_counter_live register of the command stream that is being waited on (or of any command stream) is updated and, in an embodiment, if the command stream ID register of any command stream execution unit is updated (thereby indicating that there has been a change in the command streams that are resident on the hardware execution resources) (step 116).

When an appropriate "retry" event occurs, the progress wait command is retried, and so the process returns 117 to step 113 to check again if the progress wait value to wait for is less than or equal to the progress_counter_live value of the command stream that is being waited on.

In this embodiment, the microcontroller 21 may only be involved in the process when the command stream to wait on is not resident on a hardware execution resource, or if there are pending command streams to execute if the command stream is blocked. This will therefore provide a faster path for both the incrementing of and waiting on the progress counters.

Although the technology described herein has been described above with particular reference to the performance of tessellation in graphics processing systems, the techniques of the technology described herein can equally be used for other graphics processing operations, such as interleaved rendering and when pilot shaders are being used, and in non-graphics processing arrangements, as desired.

It can be seen from the above that the technology described herein, in its embodiments at least, provides a mechanism for more efficiently handling dependencies between different processing tasks and in a manner that should not increase significantly the command stream preparation overhead. This is achieved in the embodiments of the technology described herein at least, by preparing plural command streams, e.g. relating to different types of processing task, and using appropriately configured wait commands to synchronise execution of the tasks in the different command streams.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system that comprises:
   a host processor configured to execute applications of the data processing system; and
   a processing resource configured to perform processing tasks for applications executing on the host processor;
   the method comprising:
   preparing on the host processor, in response to a request for processing to be performed by the processing resource from an application, a plurality of command streams to cause the processing resource to perform processing tasks for the application, each command stream including a sequence of commands to cause the processing resource to perform processing tasks;
   wherein preparing the command streams comprises:
      in response to a processing task to be added to a first command stream of the plurality of command streams having a dependency on a processing task or tasks that will be included in a second command stream that is another command stream of the plurality of command streams:
      including in the first command stream a wait command that will cause the processing resource to delay executing subsequent commands in the first command stream until the processing resource has reached a particular position in the second command stream;
   the method further comprising:
   the host processor providing the plurality of command streams to the processing resource; and
   the processing resource executing the commands in the plurality of command streams so as to perform processing tasks for the application;
   the executing the commands in the plurality of command streams by the processing resource comprising:
   in response to the wait command included in the first command stream, the processing resource not executing subsequent commands in the first command stream until the processing resource has reached the particular position in the second command stream; and
   in response to the processing resource reaching the particular position in the second command stream, the processing resource executing subsequent commands in the first command stream after the wait command in the first command stream.

2. The method of claim 1, wherein:
   one of the first command stream and the second command stream is a command stream that relates to processing tasks that more fully utilise the processing resources of the processing resource when they are being executed; and
   the other of the first command stream and the second command stream is a command stream that relates to processing tasks that less fully utilise the processing resources of the processing resource when being executed.

3. The method of claim 1, wherein:
   the processing resource is a graphics processor;
   one of the first command stream and the second command stream is a command stream that relates to compute tasks for the graphics processor; and
   the other of the first command stream and the second command stream is a command stream that relates to non-compute tasks for the graphics processor.

4. The method of claim 3, wherein the graphics compute tasks comprise compute tasks that are to perform tessellation, and the non-compute tasks comprise graphics geometry processing tasks.

5. The method of claim 1, comprising:
   using a progress counter that is associated with a command stream to track the position that has been reached along the command stream when preparing the command stream;
   and/or:
   using a progress counter that is associated with a command stream to track the position that has been reached along the command stream when executing the command stream.

6. The method of claim 5, comprising incrementing the progress counter for a command stream only when a particular command or commands is added to or executed for a command stream.

7. The method of claim 1, comprising:
   in response to a processing task to be added to the first command stream of the plurality of command streams having a dependency on a processing task or tasks that will be included in the second command stream of the plurality of command streams, the host processor:
   also including a wait command in the second command stream before the commands for the processing task or tasks in the second command stream that the processing task in the first command stream is dependent upon, so as to trigger the execution of the processing task or tasks in the second command stream once the processing resource has reached a particular position in the first command stream.

8. The method of claim 7, wherein:
   the particular position in the first command stream for the wait command in the second command stream is a position in the first command that is one or more processing tasks before the processing task in the first command stream that is dependent upon the processing task or tasks in the second command stream.

9. The method of claim 1, wherein the processing resource comprises:
   a plurality of command stream execution units configured to execute commands in a command stream so as to perform processing tasks for an application; and
   a controller configured to control the execution of command streams by the command stream execution units;
   the method further comprising:
   each command stream execution unit maintaining for a command stream that it is executing, a record of the position that has currently been reached in the command stream, and a record of a position in the command stream that another command stream is waiting on;
   a command stream execution unit of the plurality of command stream execution units executing the first command stream; and
   when the command stream execution unit encounters the wait command in the first command stream, the command stream execution unit signalling to the controller; and
   the controller, in response to the signal from the command stream execution unit:
   identifying that a wait command has been encountered by the command stream execution unit;
   identifying, from the wait command, that it is the second command stream that the execution of the first command stream is to wait for, and the particular position in the second command stream to be reached for execution of the first command stream to continue;

determining whether the particular position has already been reached in the second command stream; and when the particular position in the second command stream has already been reached, signalling the command stream execution unit to continue with execution of commands in the first command stream.

10. The method of claim 9, further comprising:

the controller, when the particular position in the second command stream has not yet been reached:

setting, for the second command stream, the record of a position that another command stream is waiting on to the particular position to be reached for execution of the first command stream to continue; and configuring the command stream execution unit that is executing the second command stream to signal to the controller when the set position in the second command stream has been reached;

the method further comprising:

the command stream execution unit for the second command stream, when it reaches the set position in its execution of the second command stream, signalling to the controller; and the controller, in response to that signal, identifying that it is the wait command in the first command stream for which the particular position in the second command stream has been reached, and signalling the command stream execution unit for the first command stream to restart the execution of the first command stream.

11. The method of claim 1, wherein the processing resource comprises:

a plurality of command stream execution units configured to execute commands in a command stream so as to perform processing tasks for an application; and a controller configured to control the execution of command streams by the command stream execution units;

the method further comprising:

each command stream execution unit maintaining for a command stream that it is executing, a record of the position that has currently been reached in the command stream;

a command stream execution unit of the plurality of command stream execution units executing the first command stream; and when the command stream execution unit encounters the wait command in the first command stream, the command stream execution unit:

identifying, from the wait command, that it is the second command stream that the execution of the first command stream is to wait for, and the particular position in the second command stream to be reached for execution of the first command stream to continue;

determining, from the record of the position that has currently been reached in the command stream that is being maintained by the command stream execution unit that is executing the second command stream, whether the particular position has already been reached in the second command stream; and when the particular position in the second command stream has already been reached, continuing with execution of commands in the first command stream; but when the particular position in the second command stream has not yet been reached, stopping execution of the first command stream until the particular position in the second command stream has been reached.

12. The method of claim 11, further comprising:

the command stream execution unit that encountered the wait command in the first command stream, when it determines from the record of the position that has currently been reached in the command stream that is being maintained by the command stream execution unit that is executing the second command stream, that the particular position in the second command stream has not yet been reached:

signalling to the controller configured to control the execution of command streams by the command stream execution units that the execution of the first command stream has been stopped.

13. The method of claim 11, further comprising:

the command stream execution unit that encountered the wait command in the first command stream, when the particular position in the second command stream has not yet been reached:

retrying the determining from the record of the position that has currently been reached in the command stream that is being maintained by the command stream execution unit that is executing the second command stream, whether the particular position has already been reached in the second command stream, in response to a particular event or events occurring.

14. A host processor for a data processing system, the host processor configured to execute applications of the data processing system, and comprising:

a command stream generating circuit configured to prepare, in response to a request from an application for processing to be performed by a processing resource of the data processing system, a plurality of command streams to cause the processing resource to perform processing tasks for the application, each command stream including a sequence of commands to cause the processing resource to perform processing tasks;

wherein the command stream generating circuit is further configured to:

in response to a processing task to be added to a first command stream of the plurality of command streams having a dependency on a processing task or tasks that will be included in a second command stream that is another command stream of the plurality of command streams:

include in the first command stream a wait command that will cause the processing resource to delay executing subsequent commands in the first command stream until the processing resource has reached a particular position in the second command stream;

the host processor further comprising:

a processing circuit configured to provide the plurality of command streams to the processing resource.

15. The host processor of claim 14, wherein:

one of the first command stream and the second command stream is a command stream that relates to processing tasks that more fully utilise the processing resources of the processing resource when they are being executed; and the other of the first command stream and the second command stream is a command stream that relates to processing tasks that less fully utilise the processing resources of the processing resource when being executed.

16. The host processor of claim 14, wherein:
the processing resource is a graphics processor;
one of the first command stream and the second command stream is a command stream that relates to compute tasks for the graphics processor; and
the other of the first command stream and the second command stream is command stream that relates to non-compute tasks for the graphics processor.

17. The host processor of claim 14, wherein:
the wait command indicates both that it is the second command stream that is to be waited for, and the particular position in the second command stream to be waited for.

18. The host processor of claim 14, wherein the command stream generating circuit is configured to:
in response to a processing task to be added to the first command stream of the plurality of command streams having a dependency on a processing task or tasks that will be included in the second command stream of the plurality of command streams:
also include a wait command in the second command stream before the commands for the processing task or tasks in the second command stream that the processing task in the first command stream is dependent upon, so as to trigger the execution of the processing task or tasks in the second command stream once the processing resource has reached a particular position in the first command stream.

19. A processing resource for a data processing system, the processing resource configured to perform processing tasks for applications executing on a host processor of the data processing system, and comprising:
an execution circuit configured to execute commands in a plurality of command streams received from a host processor so as to perform processing tasks for an application executing on the host processor, each command stream including a sequence of commands to cause the processing resource to perform processing tasks;
wherein the execution circuit is configured to:
in response to a first command stream of the plurality of command streams including a wait command that will cause the processing resource to delay executing subsequent commands in the command stream that includes the wait command until the processing resource has reached a particular position in a second command stream that is another command stream of the plurality of command streams, not execute subsequent commands in the first command stream after the wait command in the first command stream until the processing resource has reached the particular position in the second command stream indicated for the wait command;
and to:
in response to the processing resource reaching the particular position in the second command stream for the wait command, execute subsequent commands in the first command stream after the wait command in the first command stream.

20. The processing resource of claim 19, comprising:
a progress tracking circuit configured to use a progress counter that is associated with a command stream to track the position that has been reached along the command stream when executing the command stream.

21. The processing resource of claim 19, wherein the execution circuit comprises:

a plurality of command stream execution units configured to execute commands in a command stream so as to perform processing tasks for an application; and
a controller configured to control the execution of command streams by the command stream execution units;
each command stream execution unit being configured to:
maintain for a command stream that it is executing, a record of the position that has currently been reached in the command stream, and a record of a position in the command stream that another command stream is waiting on;
and a command stream execution unit of the plurality of command stream execution units being configured to, when executing the first command stream:
when encountering the wait command in the first command stream, signal to the controller;
and
the controller being configured to:
in response to the signal from the command stream execution unit:
identify that the wait command in the first command stream has been encountered by the command stream execution unit;
identify, from the wait command, that it is the second command stream that the execution of the first command stream is to wait for, and the particular position in the second command stream to be reached for execution of the first command stream to continue;
determine whether the particular position has already been reached in the second command stream; and
when the particular position in the second command stream has already been reached, signal the command stream execution unit to continue with execution of commands in the first command stream.

22. The processing resource of claim 19, wherein the execution circuit comprises:
a plurality of command stream execution units configured to execute commands in a command stream so as to perform processing tasks for an application; and
a controller configured to control the execution of command streams by the command stream execution units;
each command stream execution unit further being configured to:
maintain for a command stream that it is executing, a record of the position that has currently been reached in the command stream;
and a command stream execution unit of the plurality of command stream execution units being configured to, when executing the first command stream:
when encountering the wait command in the first command stream:
identify, from the wait command, that it is the second command stream that the execution of the first command stream is to wait for, and the particular position in the second command stream to be reached for execution of the first command stream to continue;
determine, from the record of the position that has currently been reached in the command stream that is being maintained by the command stream execution unit that is executing the second command stream, whether the particular position has already been reached in the second command stream; and to when the particular position in the second command stream has already been reached, continue with execution of commands in the first command stream; but when the particular position in the second command stream has not yet been reached, stop execution of the first command stream until the particular position in the another command stream has been reached.

23. A non-transitory computer readable storage medium storing computer software code which when executing on a processor of a data processing system performs a method of preparing command streams to cause a processing resource of the data processing system to perform processing tasks for applications of the data processing system, the method comprising:

preparing, in response to a request for processing to be performed by a processing resource from an application, a plurality of command streams to cause the processing resource to perform processing tasks for the application, each command stream including a sequence of commands to cause the processing resource to perform processing tasks;

wherein preparing the command streams comprises:

in response to a processing task to be added to a first command stream of the plurality of command streams having a dependency on a processing task or tasks that will be included in a second command stream that is another command stream of the plurality of command streams:

including in the first command stream a wait command that will cause the processing resource to delay executing subsequent commands in the first command stream until the processing resource has reached a particular position in the second command stream.

* * * * *